United States Patent
Lee

(10) Patent No.: US 12,424,088 B2
(45) Date of Patent: Sep. 23, 2025

(54) SYSTEM FOR TRANSMITTING AND RECEIVING DATA RELATED TO AUTONOMOUS DRIVING AND METHOD THEREOF

(71) Applicant: RIWHA Networks Co., Ltd, Chungcheongbuk-do (KR)

(72) Inventor: Chang Su Lee, Seongnam-si (KR)

(73) Assignee: RIWHA Networks Co., Ltd, Cheongjusi (KR)

( * ) Notice: Subject to any disclaimer, the term of this patent is extended or adjusted under 35 U.S.C. 154(b) by 346 days.

(21) Appl. No.: 17/862,427

(22) Filed: Jul. 12, 2022

(65) Prior Publication Data

US 2023/0108346 A1    Apr. 6, 2023

(30) Foreign Application Priority Data

Oct. 1, 2021 (KR) .......................... 10-2021-0130666
Jun. 3, 2022 (KR) .......................... 10-2022-0068009

(51) Int. Cl.
| | |
|---|---|
| *G08G 1/01* | (2006.01) |
| *G06Q 50/00* | (2024.01) |
| *G07C 5/00* | (2006.01) |
| *H04L 67/12* | (2022.01) |
| *H04W 4/40* | (2018.01) |

(52) U.S. Cl.
CPC ........... *G08G 1/0133* (2013.01); *G06Q 50/01* (2013.01); *G07C 5/008* (2013.01); *H04L 67/12* (2013.01); *H04W 4/40* (2018.02)

(58) Field of Classification Search
CPC ........... H04W 4/46; H04W 4/21; H04W 4/40; G06Q 50/01; G08G 1/0133; G08G 1/167; G08G 1/162; G07C 5/008; H04L 67/12; H04L 67/30; G06V 20/56
See application file for complete search history.

(56) References Cited

U.S. PATENT DOCUMENTS

| | | | | |
|---|---|---|---|---|
| 5,680,122 | A | * | 10/1997 | Mio ...................... G05D 1/0246 340/904 |
| 2010/0299043 | A1 | * | 11/2010 | Dorenkamp .......... B60W 30/16 701/96 |
| 2016/0323233 | A1 | | 11/2016 | Song et al. |
| 2017/0289023 | A1 | * | 10/2017 | Yamamura .............. H04W 4/02 |

(Continued)

FOREIGN PATENT DOCUMENTS

| | | |
|---|---|---|
| JP | 2009-003822 A | 1/2009 |
| JP | 2015-056828 A | 3/2015 |

(Continued)

OTHER PUBLICATIONS

Machine translation of KR102142900B1 (Year: 2020).*

(Continued)

*Primary Examiner* — Navid Z. Mehdizadeh
*Assistant Examiner* — Caitlin R McCleary
(74) *Attorney, Agent, or Firm* — Cheongjusi,

(57) ABSTRACT

Disclosed is a method for transmitting and receiving autonomous driving-related data, which includes checking, at a second mobile agent, a web server address of a first mobile agent, performing a first identity check procedure between the second mobile agent and the first mobile agent, and forming a social between the second mobile agent and the first mobile agent.

13 Claims, 22 Drawing Sheets

(56) References Cited

U.S. PATENT DOCUMENTS

| | | | |
|---|---|---|---|
| 2018/0098203 A1 | 4/2018 | Schultz et al. | |
| 2018/0324566 A1* | 11/2018 | Wang | H04W 4/40 |
| 2019/0079659 A1 | 3/2019 | Adenwala et al. | |
| 2020/0228948 A1* | 7/2020 | Watfa | H04W 48/16 |
| 2021/0303137 A1* | 9/2021 | Adenwala | H04W 4/44 |
| 2021/0370946 A1* | 12/2021 | Taniguchi | G08G 1/167 |

FOREIGN PATENT DOCUMENTS

| | | |
|---|---|---|
| KR | 10-2018-0091048 A | 8/2018 |
| KR | 10-2137798 B1 | 7/2020 |
| KR | 102142900 B1 * | 8/2020 |

OTHER PUBLICATIONS

Automotive Edge Computing Consortium (AECC) White Paper, "General Principle and Vision," Version 1.0.0, Dec. 1, 2017, 19 pages.

Chang-Su Lee, et al., "Design and implementation of real-time information sharing system of IoT using distributed social network", 2020 22nd International Conference on Advanced Communication Technology (ICACT), Global IT Research Institute, Giri, Feb. 16, 2020, pp. 237-244, XP033750018, DOI; 10.23919/CACT48636.2020.9061505.

Extended European Search Report in Application No. 22192123.2 dated Jan. 31, 2023, 9 pages.

* cited by examiner

SYSTEM FOR TRANSMITTING AND RECEIVING DATA RELATED TO AUTONOMOUS DRIVING AND METHOD THEREOF

STATEMENT REGARDING GOVERNMENT SPONSORED RESEARCH OR DEVELOPMENT

The inventive concept is derived from research conducted as part of development of start-up growth technology by the Ministry of SMEs and Startups (Project unique No.: 1425159464, Project No.: S2883964, Research project name: Connected type detachable platform for autonomous driving and connected car IoT device development business plan, project management institution: Small and Medium Business Technology Information Promotion Agency, and research period: 2020.07.15-2022.07.14).

There is no property interest of the Korean government in any aspect of this invention.

CROSS-REFERENCE TO RELATED APPLICATIONS

A claim for priority under 35 U.S.C. § 119 is made to Korean Patent Application No. 10-2021-0130666 filed on Oct. 1, 2021, and Korean Patent Application No. 10-2022-0068009 filed on Jun. 3, 2022, in the Korean Intellectual Property Office, the entire contents of which are hereby incorporated by reference.

BACKGROUND

Embodiments of the present disclosure described herein relate to a system for transmitting and receiving data related to autonomous driving and a method thereof.

A connected car is one of future social automobiles that require safe driving, minimized traffic delay, effective resource consumption, and low air pollution. The connected car performs vehicle-to-vehicle (V2V) or vehicle-to-infrastructure (V2I) communication based on vehicle-to-everything (V2X) technologies and thus provides an autonomous driving or driving assistance function or exchanges information about the traffic flow with the vehicle itself.

The autonomous driving is one of main goals of the connected car. There are two types of autonomous driving: a stand-alone type in which the vehicle has an autonomous driving function, and a connected type in which the cooperation with surrounding vehicles and the traffic infrastructure is made.

According to the stand-alone type, obstacles and lines around the vehicle are recognized based on information collected mainly from a LiDAR, Radar, and cameras, and the vehicle independently determines a driving state.

In contrast, according to the connected type, an autonomous driving function is performed while sharing location and speed information about surrounding vehicles through the communication function (V2X) with surrounding objects (i.e., vehicles and road infrastructure) and the current status of the vehicle. In particular, it is possible to set alternative routes based on the traffic conditions and the traffic flow, to prevent sudden traffic accidents, and to efficiently cope with an unavoidable accident by sending information about the unavoidable accident to the surroundings.

Many service development companies connect cars with cloud servers for the purpose of implementing the connected-type autonomous driving. As a result, it is expected that numerous data transfers between connected cars and cloud servers will be inevitable for automotive services such as autonomous driving, intelligent driving, data generation for real-time maps, and cloud-assisted driving.

In the current system where a lot of data are concentrated on the cloud server, the concentration of the data traffic on the cloud server causes an unnecessary increase in a response time and an increase in a calculation time, and there is also a security issue of the cloud server where many connected cars are registered.

SUMMARY

Embodiments of the present disclosure provide a system and a method for transmitting and receiving autonomous driving-related data, which are capable of enabling safer autonomous driving by forming a social between a mobile agent, a stationary agent, and pedestrian agents and transmitting and receiving the autonomous driving-related data between agents forming the social.

According to an embodiment, a method for transmitting and receiving autonomous driving-related data may include checking, at a second mobile agent, a web server address of a first mobile agent, performing a first identity check procedure between the second mobile agent and the first mobile agent, and forming a social between the second mobile agent and the first mobile agent.

The checking of the web server address of the first mobile agent may include sending a front-vehicle check signal to a vehicle recognition module of the first mobile agent through a vehicle recognition module of the second mobile agent, and receiving an answer signal, in which the web server address of the first mobile agent is included, from the vehicle recognition module of the first mobile agent through the vehicle recognition module of the second mobile agent.

The performing of the identity check procedure between the second mobile agent and the first mobile agent may include connecting to a web server of the first mobile agent through a social management module of the second mobile agent by using a web ID of the second mobile agent, checking the web ID of the second mobile agent connecting to the web server of the first mobile agent, through an identity check module of the first mobile agent, and fetching a profile of the second mobile agent by connecting to a web ID server of the second mobile agent having the web ID of the second mobile agent as a domain through a social management module of the first mobile agent.

The forming of the social between the second mobile agent and the first mobile agent may include opening a socket based on an IP address and a port number included in a profile of the second mobile agent fetched in the first identity check procedure through a social management module of the first mobile agent and forming a social with the second mobile agent, sending driving information of the first mobile agent to the second mobile agent through the social management module of the first mobile agent, and updating a web server address and the driving information of the first mobile agent through an identity information management module of the second mobile agent, so as to be incorporated in a profile of the second mobile agent as front-vehicle information.

The method may further include releasing, at the second mobile agent changing lanes, the social with the first mobile agent, performing a second identity check procedure between a third mobile agent under driving in back of the second mobile agent and the first mobile agent, and forming a social between the first mobile agent and the third mobile agent.

The releasing of the social with the first mobile agent may include determining whether a lane change of the second mobile agent is made, based on a change of a steering wheel rotation angle of the second mobile agent, whether a turn indicator is turned on, and whether a lane change is made, which are collected through a driving information management module, a navigation module, and a lane recognition module of the second mobile agent, sending, to the third mobile agent, the web server address of the first mobile agent corresponding to front-vehicle information included in a profile of the second mobile agent through a social management module of the second mobile agent, deleting the front-vehicle information included in the profile of the second mobile agent through an identity information management module of the second mobile agent, and releasing the social with the first mobile agent and the third mobile agent through the social management module of the second mobile agent.

The performing of the second identity check procedure between the third mobile agent under driving in back of the second mobile agent and the first mobile agent may include determining whether front-vehicle information included in a profile of the third mobile agent and a web server address received from the second mobile agent are different, through a social management module of the third mobile agent, and updating the web server address of the first mobile agent being the web server address received from the second mobile agent through an identity information management module of the third mobile agent, so as to be incorporated in the profile of the third mobile agent as front-vehicle information The performing of the second identity check procedure between the third mobile agent under driving in back of the second mobile agent and the first mobile agent may further include connecting to a web server of the first mobile agent through the social management module of the third mobile agent by using a web ID of the third mobile agent, checking the web ID of the third mobile agent connecting to the web server of the first mobile agent, through an identity check module of the first mobile agent, and fetching the profile of the third mobile agent by connecting to a web ID server of the third mobile agent having the web ID of the third mobile agent as a domain through a social management module of the first mobile agent.

The forming of the social between the first mobile agent and the third mobile agent may include opening a socket based on an IP address and a port number included in a profile of the third mobile agent fetched in the second identity check procedure through a social management module of the first mobile agent and forming a social with the second mobile agent, sending driving information of the first mobile agent to the third mobile agent through the social management module of the first mobile agent, and updating a web server address and the driving information of the first mobile agent through an identity information management module of the third mobile agent, so as to be incorporated in the profile of the third mobile agent as front-vehicle information.

The method may further include forming, at the second mobile agent whose lane is changed, a new social with a fourth mobile agent under driving in front of the changed lane or a fifth mobile agent under driving in back of the changed lane.

The forming of the new social with the fourth mobile agent or the fifth mobile agent may include forming, at the second mobile agent whose lane is changed, the new social with the fourth mobile agent, and the forming of the new social with the fourth mobile agent may include obtaining, at the second mobile agent, a web server address of the fourth mobile agent in front of the second mobile agent, performing a third identity check procedure between the second mobile agent and the fourth mobile agent, releasing, at the fourth mobile agent, a social with the fifth mobile agent, and forming, at the second mobile agent, a social with the fourth mobile agent and the fifth mobile agent.

The obtaining of the web server address of the fourth mobile agent in front of the second mobile agent may include sending a front-vehicle check signal to a vehicle recognition module of the fourth mobile agent through a vehicle recognition module of the second mobile agent, and receiving an answer signal, in which the web server address of the fourth mobile agent is included, from the vehicle recognition module of the fourth mobile agent through the vehicle recognition module of the second mobile agent.

The performing of the third identity check procedure between the second mobile agent and the fourth mobile agent may include connecting to a web server of the fourth mobile agent through a social management module of the second mobile agent by using a web ID of the second mobile agent, checking the web ID of the second mobile agent connecting to the web server of the fourth mobile agent, through an identity check module of the fourth mobile agent, and fetching a profile of the second mobile agent by connecting to a web ID server of the second mobile agent having the web ID of the second mobile agent as a domain through a social management module of the fourth mobile agent.

The releasing of the social with the fifth mobile agent may include determining whether a web server address of a mobile agent is included in front-vehicle information of a profile of the second mobile agent fetched in the third identity check procedure, through a social management module of the fourth mobile agent, and when it is determined that the web server address of the mobile agent is absent from the front-vehicle information of the profile of the second mobile agent, sending a web server address of the second mobile agent to the fifth mobile agent maintaining a previously formed social through the social management module of the fourth mobile agent and releasing the social with the fifth mobile agent.

The forming of the social with the fourth mobile agent and the fifth mobile agent may include determining whether front-vehicle information included in a profile of the fifth mobile agent and a web server address received from the fourth mobile agent are different, through a social management module of the fifth mobile agent, when it is determined that the front-vehicle information included in the profile of the fifth mobile agent and the web server address received from the fourth mobile agent are different, updating a web server address of the second mobile agent being the web server address received from the fourth mobile agent so as to be incorporated in the profile of the fifth mobile agent as front-vehicle information, forming a social with the second mobile agent through a social management module of the fourth mobile agent and sending driving information of the fourth mobile agent, connecting to a web server of the second mobile agent through the social management module of the fifth mobile agent by using a web ID of the fifth mobile agent, checking the web ID of the fifth mobile agent connecting to the web server of the second mobile agent, through an identity check module of the second mobile agent, fetching the profile of the fifth mobile agent by connecting to a web ID server of the fifth mobile agent having a web ID connecting to the web server of the second mobile agent as a domain through a social management module of the second mobile agent, when a web server address included in front-vehicle information present in the profile fetched from the fifth mobile agent through the social management module of the second mobile agent is identical to the web server address of the second mobile agent, forming a social with the fifth mobile agent and sending driving information of the second mobile agent, and updating the driving information of the second mobile agent through an identity information management module of the fifth mobile agent so as to be incorporated in the profile of the fifth mobile agent as front-vehicle information.

The forming of the new social with the fourth mobile agent or the fifth mobile agent may include forming, at the second mobile agent whose lane is changed, the new social with the fourth mobile agent, and the forming of the new social with the fifth mobile agent may include obtaining, at the fifth mobile agent, a web server address of the second mobile agent in front of the fifth mobile agent, performing a fourth identity check procedure between the fifth mobile agent and the second mobile agent, releasing, at the fourth mobile agent, a social with the fifth mobile agent, and forming, at the second mobile agent, a social with the fourth mobile agent and the fifth mobile agent.

The forming of the social with the fourth mobile agent and the fifth mobile agent may include fetching a profile of the fifth mobile agent from the fifth mobile agent through a social management module of the second mobile agent, checking a web server address of the fourth mobile agent being front-vehicle information included in the profile of the fifth mobile agent through the social management module of the second mobile agent, and connecting to a web server of the fourth mobile agent through the social management module of the second mobile agent by using a web ID of the second mobile agent.

The checking of the web server address of the first mobile agent may further include obtaining a web server address of a stationary agent placed within a preset distance in front of the second mobile agent through a navigation module of the second mobile agent.

The performing of the identity check procedure between the second mobile agent and the first mobile agent may include forming a social with the second mobile agent through a social management module of the stationary agent and sending information about a mobile agent forming the most recent social, included in a profile of the stationary agent, and operation information of the stationary agent to the second mobile agent, updating the information about the mobile agent forming the most recent social, provided from the stationary agent, through an identity information management module of the second mobile agent so as to be incorporated in the profile of the second mobile agent as front-vehicle information.

The performing of the identity check procedure between the second mobile agent and the first mobile agent may further include collecting location information of a pedestrian and sending the collected location information to the second mobile agent, when the stationary agent is an IOT device mounted in a pedestrian traffic light.

The method may further include releasing a social between the second mobile agent and the stationary agent, when a distance between the second mobile agent and the stationary agent is less than a present distance.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
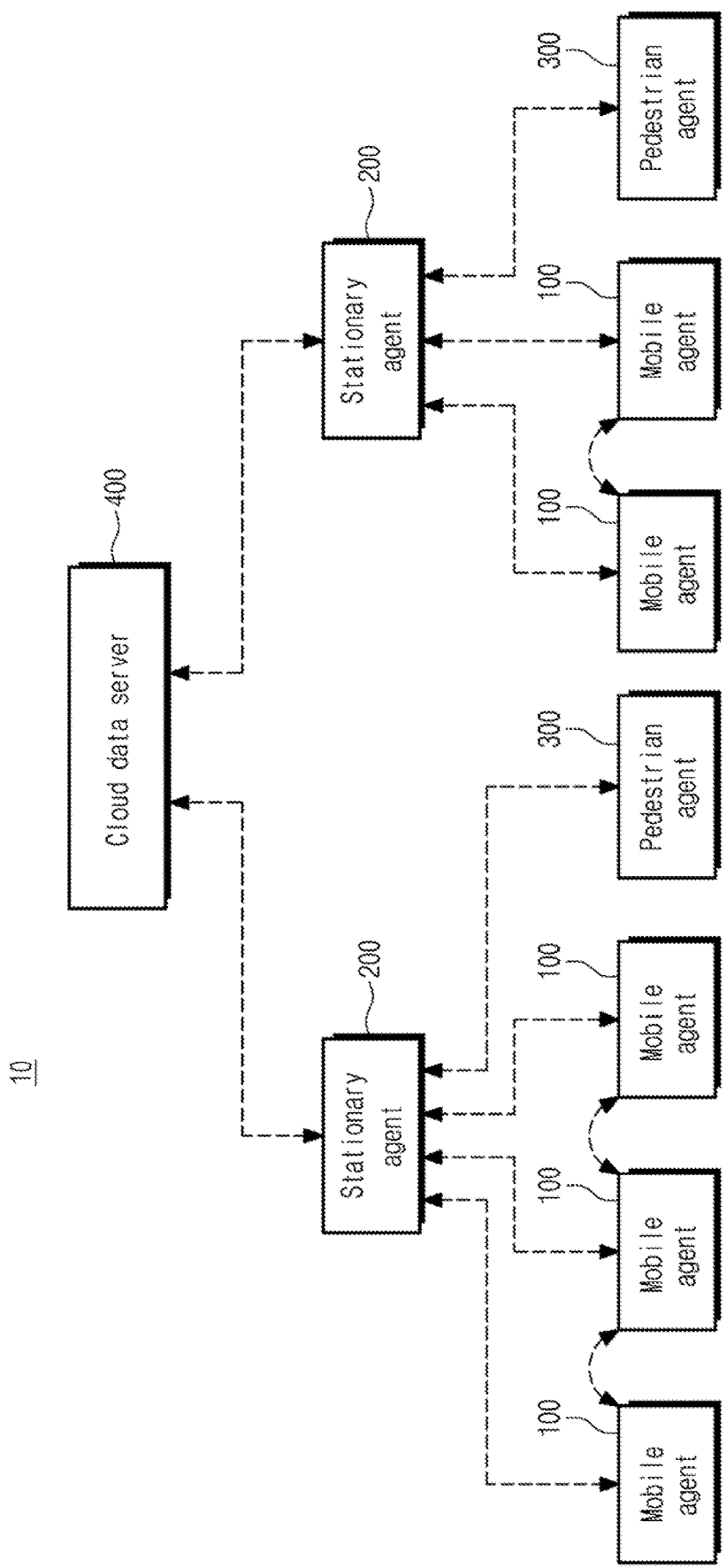
FIG. 1 is a diagram illustrating a configuration of an autonomous driving-related data transmitting and receiving system according to an embodiment of the present disclosure.

Hereinafter, embodiments according to the present disclosure will be described in detail with reference to the accompanying drawings.

In addition, in describing the present disclosure, in the case where it is determined that the detailed description of a related known configuration or function may obscure the essential points of the invention, the detailed description may be omitted.

Embodiments of the present disclosure are provided to more completely describe the present disclosure to those skilled in the art. The following embodiments may be modified in many different forms, and the scope of the invention is not limited to the following embodiments. Accordingly, these embodiments are produced to make the present disclosure more faithful and complete, and to completely deliver the spirit of the invention to those skilled in the art.

In addition, in the following drawings, each component is exaggerated for convenience and clarity of description, and the same reference numerals in the drawings refer to the same elements. As used in the specification, the term "and/or" includes one of corresponding listed items and all combinations of one or more of the corresponding listed items.

Terms used in this specification are provided to describe a specific embodiment, but not to limit the present disclosure.

As used in this specification, a singular form may include a plural form unless contexts clearly indicate another case. Besides, when used in this specification, "comprise" and/or "comprising" does not exclude presence or addition of one or more other shapes, numbers, actions, members, elements, and/or groups in addition to the aforementioned shapes, numbers, steps, actions, members, elements and/or groups thereof.

FIG. 1 is a diagram illustrating a configuration of an autonomous driving-related data transmitting and receiving system 10 according to an embodiment of the present disclosure.

Referring to FIG. 1, the autonomous driving-related data transmitting and receiving system 10 may include a mobile agent 100, a stationary agent 200, a pedestrian agent 300, and a cloud data server 400.

The cloud data server 400 manages and modifies operation information of the stationary agents 200 and sends the modified operation information to the stationary agents 200. The stationary agents 200 store the operation information thus delivered and are operated based on the stored operation information.

Driving information including a driving speed, an engine RPM, whether left and right turn indicators operate, a steering direction, whether a brake operates, a driving lane, whether an emergency light operates, etc. may be directly transmitted and received between the mobile agents 100 forming the social without passing through the stationary agents 200, so as to be utilized in the autonomous driving.

For example, the mobile agent 100 may be an IoT device mounted in a vehicle, and the stationary agent 200 may be an IoT device 201 (hereinafter referred to as a "vehicle traffic light") mounted in a vehicle traffic light, an IoT device 202 (hereinafter referred to as a "pedestrian traffic light") mounted in a pedestrian traffic light, or an IoT device 203 (hereinafter referred to as a "street light") mounted in a street light.

Operation information (e.g., real-time signal-related information of a traffic light or on/off-related information of a street light) of a stationary agent is transmitted and received between the mobile agent 100 and the stationary agent 200 forming the social, so as to be utilized in the autonomous driving; additionally, information about the mobile agent 100 forming the immediately previous social may be stored in the stationary agent 200.

Among the stationary agents 200, the pedestrian traffic light may obtain location information of the pedestrian agent 300 (e.g., a smartphone possessed by a pedestrian) forming the social and sends the obtained location information to the vehicle traffic light connected through a wired/wireless communication network, and the vehicle traffic light sends the obtained location information to the mobile agent 100 forming the social. As such, it may be possible for a driver to easily identify the location of the pedestrian.

Figure 2:
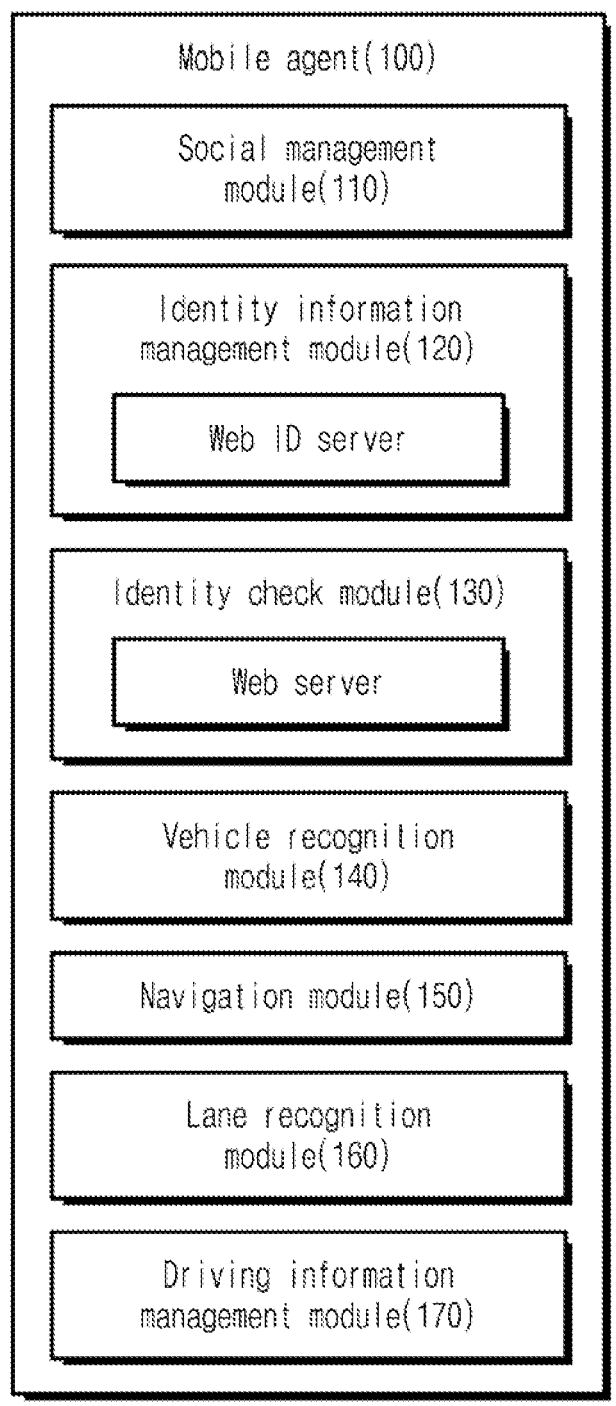
FIG. 2 is a diagram illustrating a configuration of a mobile agent.
Figure 3:
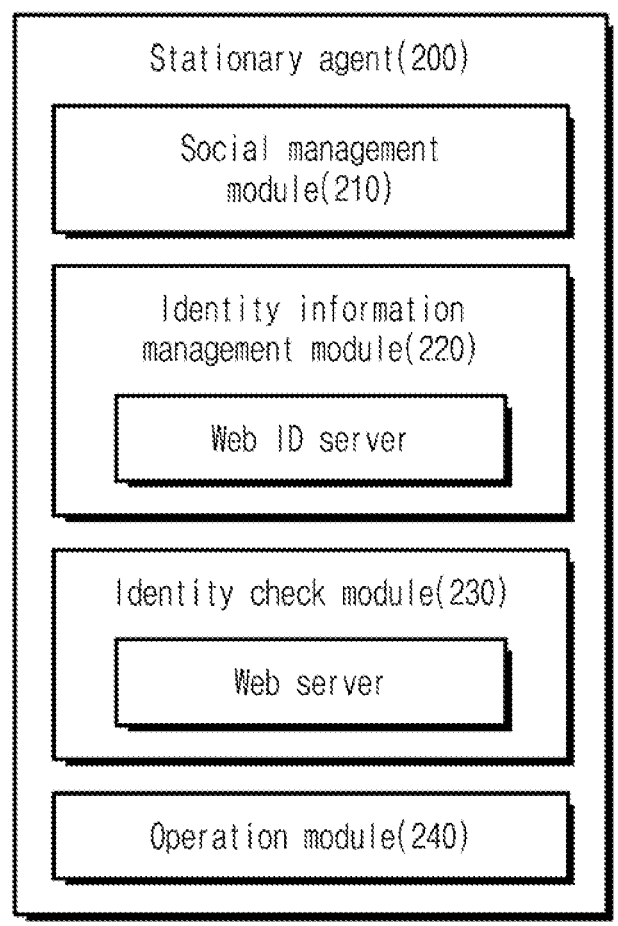
FIG. 3 is a diagram illustrating a configuration of a stationary agent.
Figure 4:
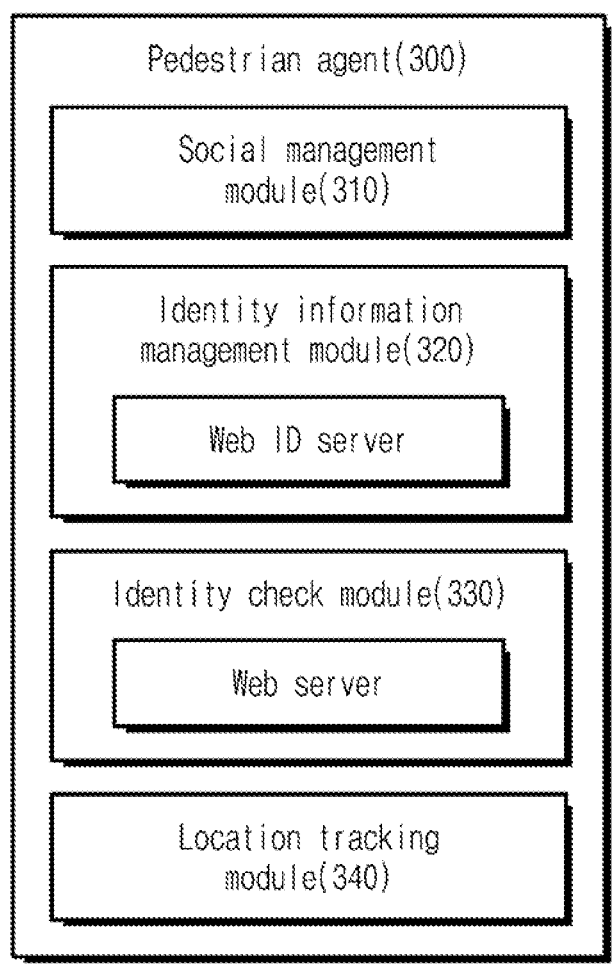
FIG. 4 is a diagram illustrating a configuration of a pedestrian agent.

FIG. 2 is a diagram illustrating a configuration of the mobile agent 100, FIG. 3 is a diagram illustrating a configuration of the stationary agent 200, and FIG. 4 is a diagram illustrating a configuration of the pedestrian agent 300.

Referring to FIGS. 2 to 4, the mobile agent 100, the stationary agent 200, and the pedestrian agent 300 include a social management module 110, 210, or 310, an identity information management module 120, 220, or 320, and an identity check module 130, 230, or 330 in common.

The social management module (e.g., 110) exchanges data with the social management module (e.g., 210 or 310) included in any other agent and forms the social therewith or releases the social.

The identity information management module may control a web ID server, and an own profile (of an agent including a corresponding identity information management module) may be stored in the web ID server.

The profile of the mobile agent 100 includes an own web server address, an own web ID, an IP address, a port number, driving information (i.e., information about a driving speed, a driving lane, a steering direction, etc.), front vehicle information (i.e., a web server address of the front vehicle and driving information of the front vehicle).

In addition, the profile of the stationary agent 200 includes an own web server address, an own web ID, an IP address, a port number, and information about a mobile agent forming the most recent social (i.e., a web server address and driving information of the mobile agent forming the most recent social).

The identity check module may control a web server and may check a web ID of an agent connecting to the web server.

Below, in addition to the above components, components that are included for each of the mobile agent 100, the stationary agent 200, and the pedestrian agent 300 will be described.

The mobile agent 100 may further include a vehicle recognition module 140, a navigation module 150, a lane recognition module 160, and a driving information management module 170.

The vehicle recognition module 140 may check a web server address of a front vehicle by using a short-range communication sensor that is provided in a vehicle under driving.

In detail, when front vehicle information is absent from the profile stored in the web ID server controlled by the identity information management module 120, the vehicle recognition module 140 sends a front-vehicle check signal, in which own GPS location information, driving direction information, and driving lane information are included, to a plurality of mobile agents under driving. Each of mobile agents, which have the same driving direction and driving lane as the mobile agent sending the front-vehicle check signal and each of which makes determination, through the GPS location information, that it is driving in front of the mobile agent sending the front-vehicle check signal, from among a plurality of mobile agents receiving the front-vehicle check signal sends an answer signal, in which information about an own web server address and information about a distance from the mobile agent sending the front-vehicle check signal are included, to the mobile agent sending the front-vehicle check signal. The mobile agent sending the front-vehicle check signal selects a mobile agent the closest to the mobile agent sending the front-vehicle check signal as a front vehicle, based on the answer signals.

The navigation module 150 provides locations of the stationary agents 200 and map information where the web server addresses of the stationary agents 200 are stored.

The lane recognition module 160 recognizes real-time lane information of a vehicle under driving, for example, recognizes whether a current driving lane is the first lane or the second lane.

The driving information management module 170 collects information about driving, such as a driving speed and a steering direction, through on board diagnostics (OBD) provided in a vehicle under driving.

The stationary agent 200 may further include an operation module 240. When the stationary agent 200 is the vehicle traffic light, the operation module 240 may receive real-time signal information of the vehicle traffic light from the cloud data server 400 and may control a signal of the vehicle traffic light based on the real-time signal information. Also, when the stationary agent 200 is the pedestrian traffic light, the operation module 240 may receive real-time signal information of the pedestrian traffic light from the cloud data server 400 and may control a signal of the pedestrian traffic light based on the real-time signal information.

The pedestrian agent 300 may further include a location tracking module 340. The location tracking module 340 may track a real-time location of the pedestrian agent 300 by using GSP information and may provide locations of the stationary agents 200 and map information where web server addresses of the stationary agents 200 are stored.

Below, how to form and release the social between the mobile agents 100, between the mobile agent 100 and the stationary agent 200, and between the mobile agent 100, the stationary agent 200, and the pedestrian agent 300 will be described. In addition, data that are exchanged in the social forming and releasing process will be described in detail.

Figure 5:
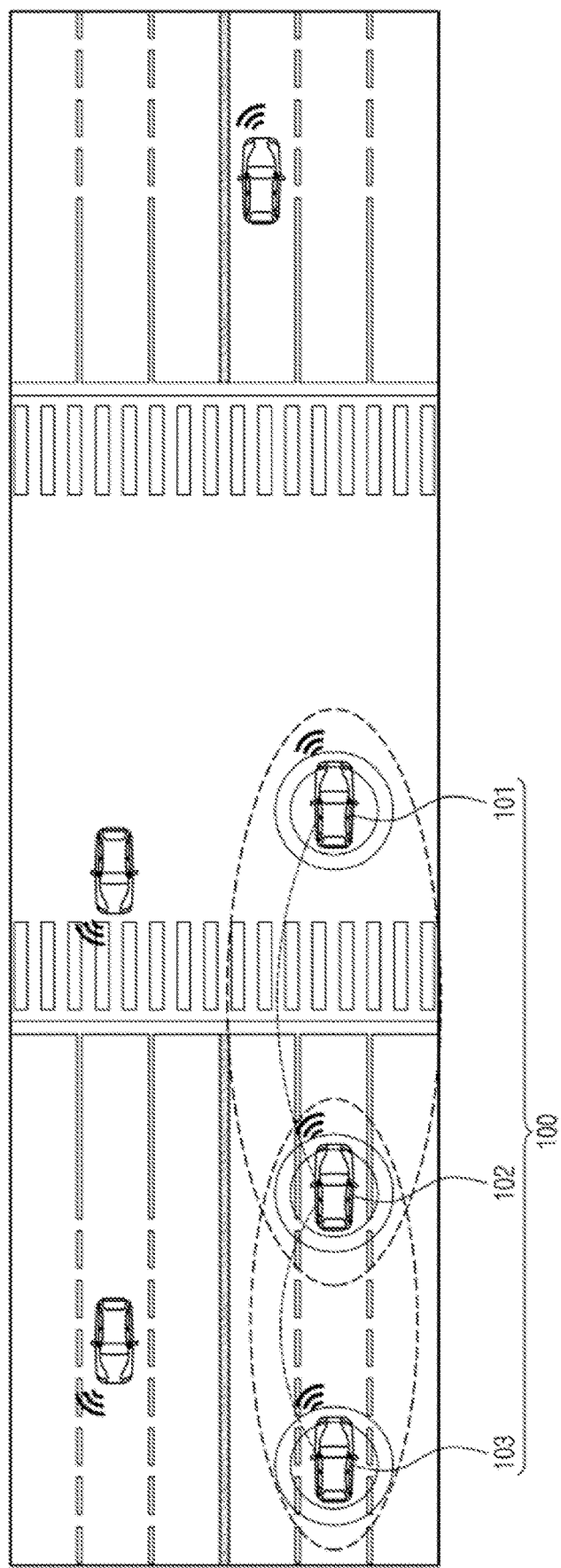
FIG. 5 is a diagram illustrating a situation where a first mobile agent, a second mobile agent, and a third mobile agent drive in the same lane.
Figure 6:
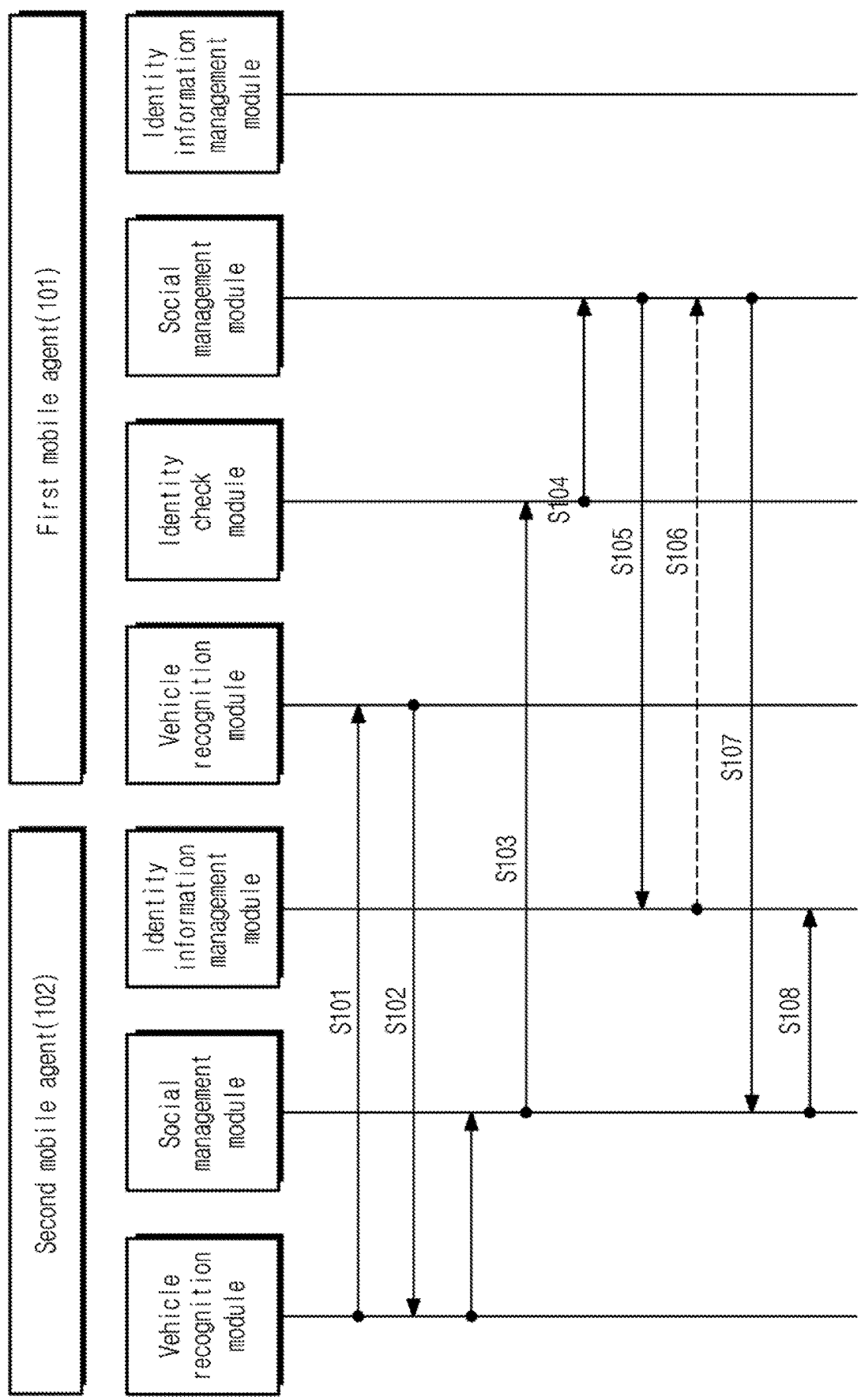
FIG. 6 is a diagram illustrating a process of forming a social between a first mobile agent, a second mobile agent, and a third mobile agent in the situation of FIG. 5.

FIG. 5 is a diagram illustrating a situation where a first mobile agent 101, a second mobile agent 102, and a third mobile agent 103 drive in the same lane, and FIG. 6 is a diagram illustrating a process of forming a social between the first mobile agent 101, the second mobile agent 102, and the third mobile agent 103 in the situation of FIG. 5.

Referring to FIGS. 5 and 6, it may be understood that the first mobile agent 101 is driving in front of the second mobile agent 102 on the same lane and the third mobile agent 103 is driving in back of the second mobile agent 102 on the same lane.

The process of forming the social between mobile agents is as follows.

Below, the process of forming the social between the second mobile agent 102 and the first mobile agent 101 will be described as an example. However, when the third mobile agent 103 is driving in back of the second mobile agent 102, the social between the second mobile agent 102 and the third mobile agent 103 may be formed through the same process.

First, the vehicle recognition module of the second mobile agent 102 sends the front-vehicle check signal to the vehicle recognition module of the first mobile agent 101 (S101). In detail, when the second mobile agent 102 checks that the front-vehicle information is absent from the profile stored in the web ID server that the identity information management module 120 of the second mobile agent 102 controls, the second mobile agent 102 sends the front-vehicle check signal, in which GPS location information, a driving direction, and driving lane information of the second mobile agent 102 are included, to a plurality of mobile agents under driving around the second mobile agent 102; in this process, the second mobile agent 102 also sends the front-vehicle check signal to the first mobile agent 101.

When the vehicle recognition module of the first mobile agent 101 receiving the front-vehicle check signal sends the answer signal in which the web server address of the first mobile agent 101 is included, the vehicle recognition module of the second mobile agent 102 receives the answer signal (S102). In detail, each of the mobile agents 100, which have the same driving direction and driving lane as the mobile agent sending the front-vehicle check signal and each of which makes determination, through the GPS location information, that it is driving in front of the mobile agent sending the front-vehicle check signal, from among the plurality of mobile agents 100 receiving the front-vehicle check signal sends the answer signal, in which information about an own web server address and information about a distance from the mobile agent sending the front-vehicle check signal are included, to the mobile agent sending the front-vehicle check signal. Accordingly, because the first mobile agent 101 determines that the first mobile agent 101 has the same driving direction and driving lane as the second mobile agent 102 and determines, through the GPS location information, that it is driving in front of the second mobile agent 102, the first mobile agent 101 sends the answer signal, in which the web server address of the first mobile agent 101 is included, to the second mobile agent 102.

The social management module of the second mobile agent 102 connects to the web server of the first mobile agent 101 by using the web ID of the second mobile agent 102 (S103). In detail, the social management module of the second mobile agent 102 selects a mobile agent the closest to the second mobile agent 102 as a front vehicle of the second mobile agent 102, based on the plurality of answer signals. Accordingly, the second mobile agent 102 selects the first mobile agent 101 driving in front of the second mobile agent 102 as a front vehicle of the second mobile agent 102 and thus connects to the web server of the first mobile agent 101.

Each mobile agent 100 may have a web ID based on an own vehicle number, and the profile of the corresponding mobile agent may be stored in a web ID server having the corresponding web ID as a domain.

For example, when the vehicle number of the second mobile agent 102 is "22 ro2222", the web ID of the second mobile agent 102 may be "https://22ro2222.cars.kr:8443/profile/card#me", and the profile of the second mobile agent 102 may be stored in a web ID server having "https://22ro2222.cars.kr:8443/profile/card#me" as a domain.

The first mobile agent 101 checks the web ID of the second mobile agent 102 connecting to the web server of the first mobile agent 101 through the identity check module (S104), connects to the web ID server of the second mobile agent 102 having the corresponding web ID as a domain through the social management module (S105), and fetches the profile of the second mobile agent 102 (S106).

The social management module of the first mobile agent 101 opens a socket based on the IP address and the port number present in the profile of the second mobile agent 102, and sends driving information of the first mobile agent 101 to the corresponding socket after forming the social with the second mobile agent 102 (S107). In this case, the driving information of the first mobile agent 101 refers to information, which is collected through the on board diagnostics (OBD) of a vehicle corresponding to the driving information management module, such as a driving speed, a driving direction, and a steering direction of a vehicle.

Finally, the identity information management module of the second mobile agent 102 updates the web server address and the driving information of the first mobile agent 101 so as to be incorporated in the front-vehicle information of the profile of the second mobile agent 102 (S108).

The social between the first mobile agent 101 and the second mobile agent 102 may be formed through operation S101 and operation S108 described above, and when the third mobile agent 103 is driving in back of the second mobile agent 102, the social between the second mobile agent 102 and the third mobile agent 103 may be formed through the same process.

Figure 7:
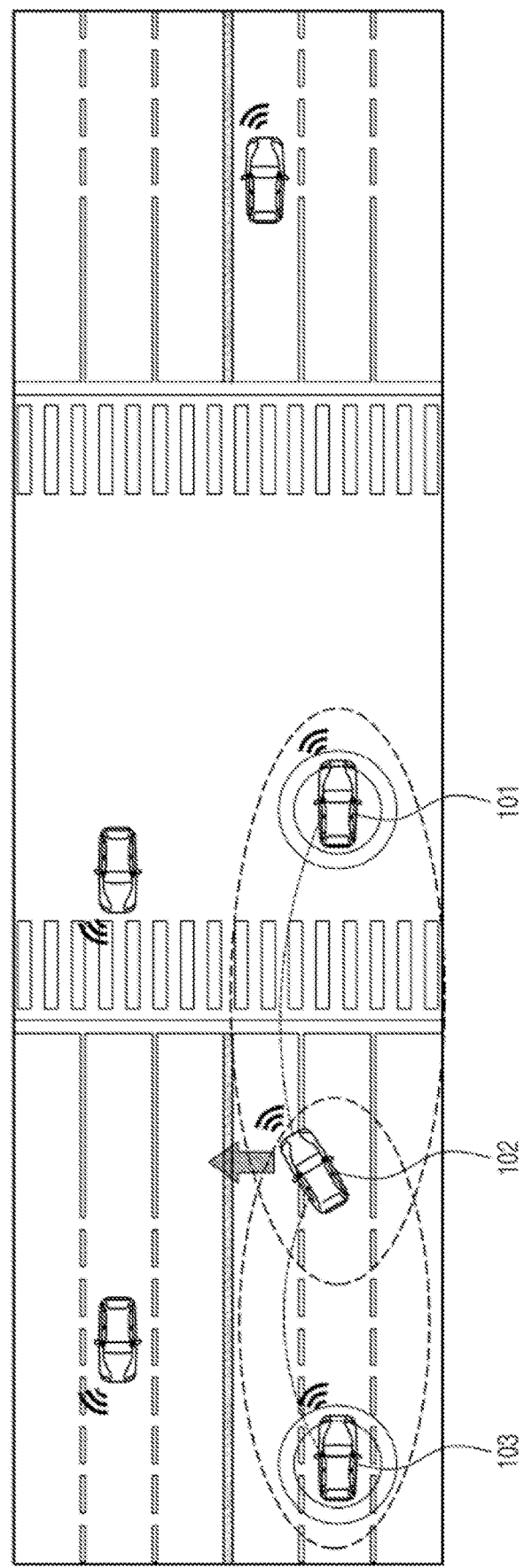
FIG. 7 is a diagram illustrating a situation in which a second mobile agent under driving between a first mobile agent and a third mobile agent changes lanes.
Figure 8:
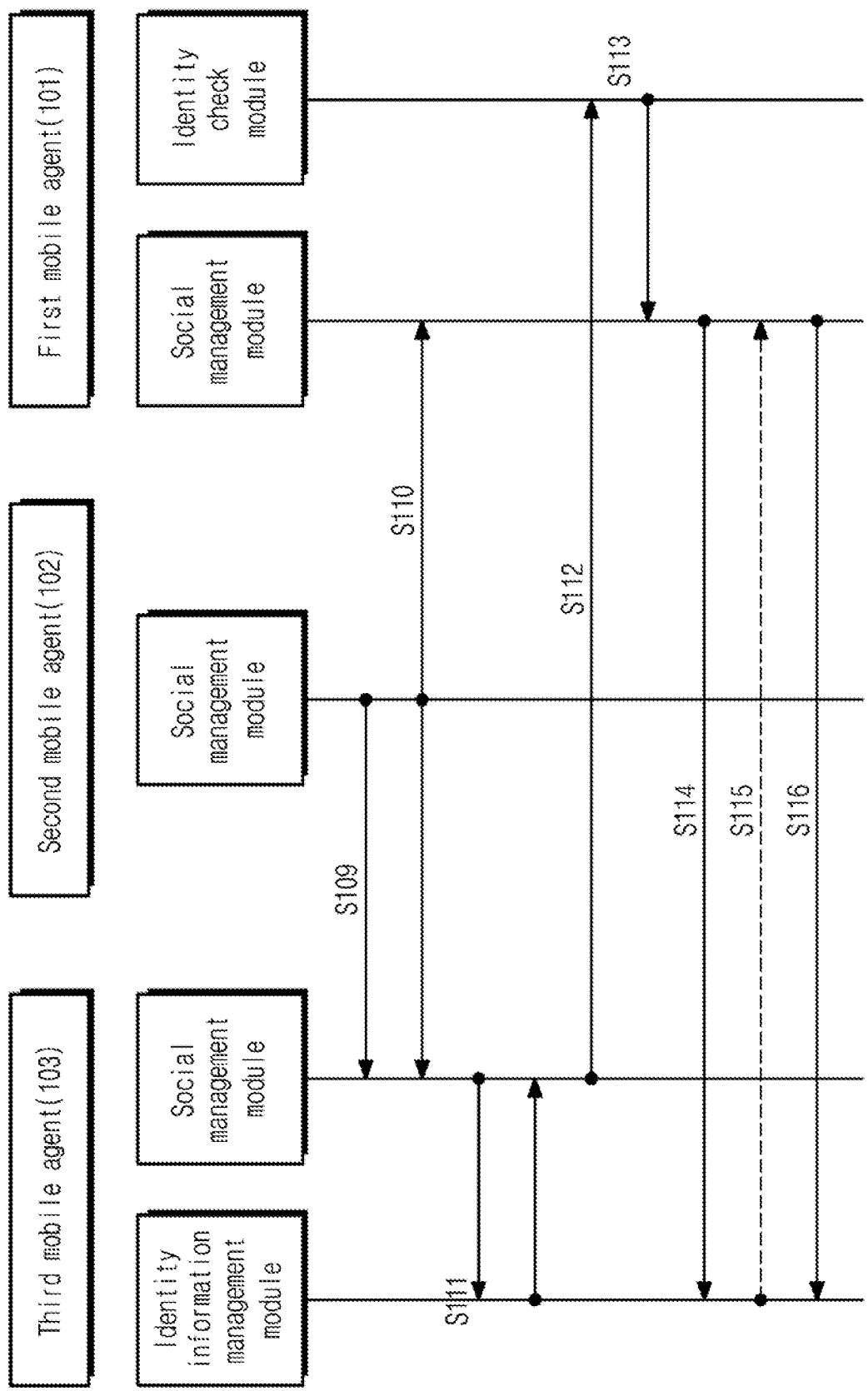
FIG. 8 is a diagram illustrating a process in which a second mobile agent releases social formation with a first mobile agent and a third mobile agent and a first mobile agent and a third mobile agent form a social under the assist of a second mobile agent, in the situation of FIG. 7.

FIG. 7 is a diagram illustrating a situation in which the second mobile agent 102 under driving between the first mobile agent 101 and the third mobile agent 103 changes lanes, and FIG. 8 is a diagram illustrating a process in which the second mobile agent 102 releases the social formation with the first mobile agent 101 and the third mobile agent 103 and the first mobile agent 101 and the third mobile agent 103 form the social under the assist of the second mobile agent 102, in the situation of FIG. 7.

Figure 9:
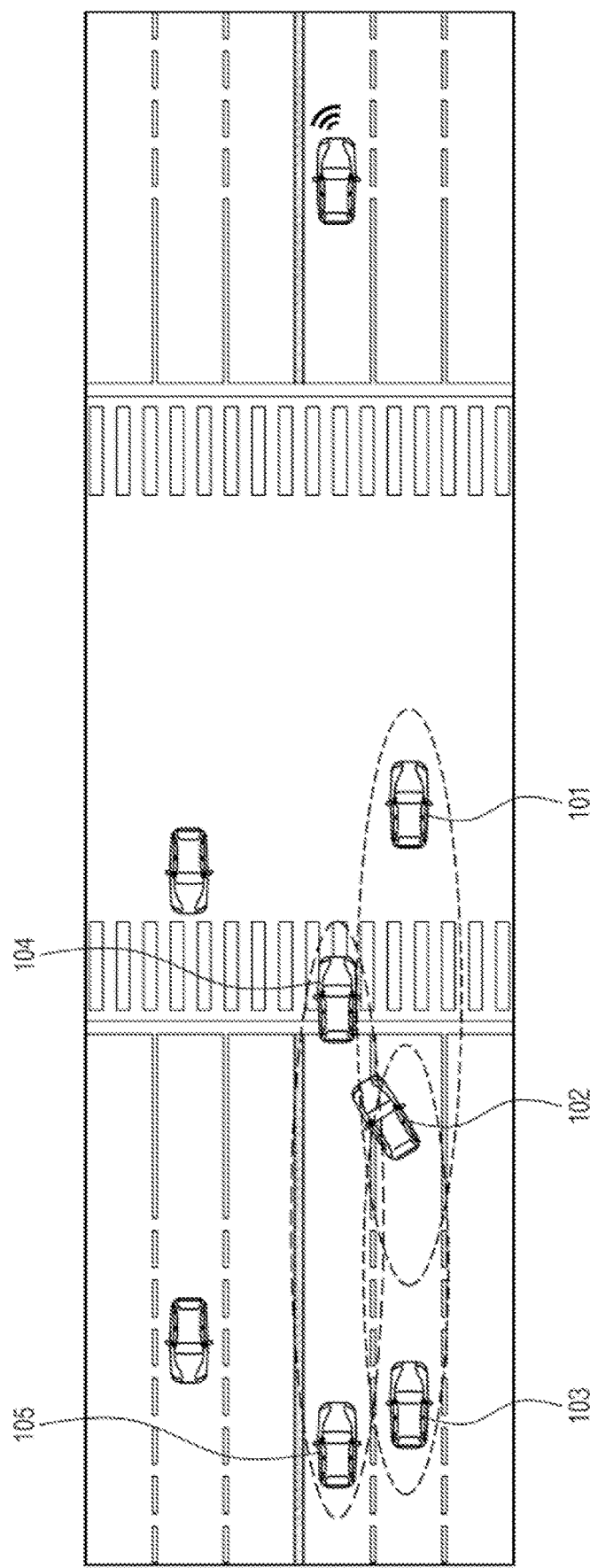
FIG. 9 is a diagram illustrating a situation where a second mobile agent changes lanes to the rear of a fourth mobile agent.

Referring to FIGS. 7 and 8, it may be understood that the second mobile agent 102 changes lanes and is entering between a fourth mobile agent 104 and a fifth mobile agent 105 (a fourth mobile agent 104 and a fifth mobile agent 105 are illustrated in FIG. 9).

The social forming and releasing process that is performed under the above situation is as follows.

First, when a lane change of the second mobile agent 102 is checked through 1) conditions, which are capable of being checked through the driving information management module of the second mobile agent 102, such as a change of a steering wheel rotation angle and whether the left/right turn indicator is turned on, and 2) conditions, which are capable of being checked through the navigation module and the lane recognition module thereof, such as whether a lane change is made, the social management module of the second mobile agent 102 releases the social formation with the first mobile agent 101 and the third mobile agent 103.

In detail, when it is determined that the lane of the second mobile agent 102 is changed, the social management module of the second mobile agent 102 sends the web server address of the first mobile agent 101 to the social management module of the third mobile agent 103 (S109) and releases the social formation with the first mobile agent 101 and the third mobile agent 103 through the social management module after deleting the web server address of the first mobile agent 101 from the front-vehicle information in the profile of the second mobile agent 102 through the identity information management module (S110).

When it is determined that the front-vehicle information (i.e., the web server address of the front vehicle) stored in the profile of the third mobile agent 103 and the web server address received from the second mobile agent 102 are different, the third mobile agent 103 that receives the web server address of the first mobile agent 101 from the second mobile agent 102 updates the profile by storing the web server address received from the second mobile agent 102 as the front-vehicle information of the third mobile agent 103 (S111).

In other words, when the third mobile agent 103 receives, from the second mobile agent 102, the web server address of the first mobile agent 101 being the web server address different from the front-vehicle information (i.e., the web server address of the second mobile agent 102 being an existing front vehicle) stored in the profile of the third mobile agent 103, the third mobile agent 103 updates the profile of the third mobile agent 103 by storing the web server address of the first mobile agent 101 as the front-vehicle information of the third mobile agent 103.

The social management module of the third mobile agent 103 connects to the web server address of the first mobile agent 101 stored in the profile by using the web ID of the third mobile agent 103 (S112).

The first mobile agent 101 checks the web ID of the third mobile agent 103 connecting to the web server of the first mobile agent 101 through the identity check module (S113), connects to the web ID server of the third mobile agent 103 having the corresponding web ID as a domain through the social management module (S114), and fetches the profile of the third mobile agent 103 (S115).

When it is determined that the web server address included in the front-vehicle information stored in the profile fetched from the third mobile agent 103 is identical to the web server address of the first mobile agent 101, the social management module of the first mobile agent 101 opens the socket based on the IP address and the port number present in the profile of the third mobile agent 103 and sends driving information of the first mobile agent 101 to the corresponding socket after forming the social with the third mobile agent 103 (S116).

Finally, the identity information management module of the third mobile agent 103 updates the web server address and the driving information of the first mobile agent 101 so as to be incorporated in the front-vehicle information of the third mobile agent 103.

Through operation S109 to operation S116, the second mobile agent 102 may release the social formation with the first mobile agent 101 and the third mobile agent 103, and a new social may be formed between the first mobile agent 101 and the third mobile agent 103.

Figure 10:
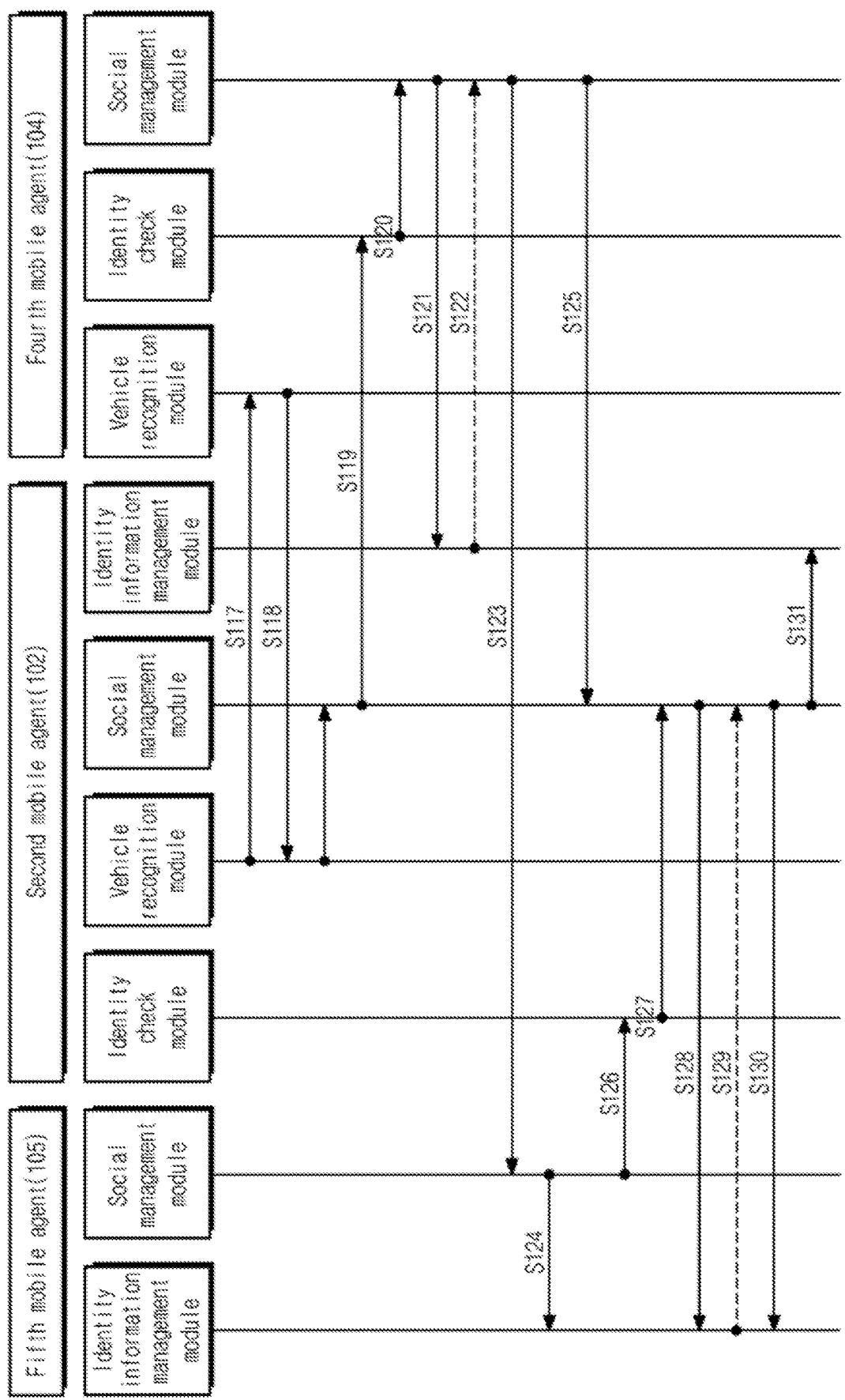
FIG. 10 is a diagram illustrating a process where a social between a fourth mobile agent and a fifth mobile agent is released and a social is formed between a second mobile agent and a fourth mobile agent, in the situation of FIG. 9.

FIG. 9 is a diagram illustrating a situation where the second mobile agent 102 changes lanes to the rear of the fourth mobile agent 104, and FIG. 10 is a diagram illustrating a process where the social between the fourth mobile agent 104 and the fifth mobile agent 105 is released and the social is formed between the second mobile agent 102 and the fourth mobile agent 104, in the situation of FIG. 9.

Referring to FIGS. 9 and 10, it may be understood that the second mobile agent 102 changes lanes and is going to move to the rear of the fourth mobile agent 104 under driving on the changed lane.

The social forming and releasing process that is performed when the second mobile agent 102 changes lanes and goes to the rear of the fourth mobile agent 104 is as follows.

First, the vehicle recognition module of the second mobile agent 102 sends the front-vehicle check signal to the vehicle recognition module of the fourth mobile agent 104 (S117).

When the vehicle recognition module of the fourth mobile agent 104 receiving the front-vehicle check signal sends the answer signal in which the web server address of the fourth mobile agent 104 is included, the vehicle recognition module of the second mobile agent 102 receives the answer signal (S118).

The social management module of the second mobile agent 102 connects to the web server of the fourth mobile agent 104 by using the web ID of the second mobile agent 102 (S119).

Operation S117 to operation S119 are identical to operation S101 to operation S103 described above, and thus, additional description will be omitted to avoid redundancy.

The fourth mobile agent 104 checks the web ID of the second mobile agent 102 connecting to the web server of the fourth mobile agent 104 through the identity check module (S120), connects to the web ID server of the second mobile agent 102 having the corresponding web ID as a domain through the social management module (S121), and fetches the profile of the second mobile agent 102 (S122). Because the web server address of the second mobile agent 102 is present in the profile, the fourth mobile agent 104 may know the web server address of the second mobile agent 102 through the above process.

The second mobile agent 102 is in a state where the web server address of the front vehicle present in the front-vehicle information of the profile of the second mobile agent 102 is deleted in the process of releasing the social formation with the first mobile agent 101 and the third mobile agent 103.

Accordingly, when it is determined that the web server address is absent from the front-vehicle information of the profile of the second mobile agent 102, the social management module of the fourth mobile agent 104 sends the web server address of the second mobile agent 102 to the fifth mobile agent 105 that has previously formed the social and releases the social formation with the fifth mobile agent 105 (S123).

That is, the above process corresponds to the case where an existing social is released by the lane change of the second mobile agent 102, in other words, by any other agent, not agents maintaining the social formation.

In other words, when the social management module of the fifth mobile agent 105 receives, from the fourth mobile agent 104, the web server address of the second mobile agent 102 being the web server address different from the front-vehicle information (i.e., the web server address of the fourth mobile agent 104 being an existing front vehicle) stored in the profile of the fifth mobile agent 105, the social management module of the fifth mobile agent 105 updates the web server address of the second mobile agent 102 so as to be incorporated in the front-vehicle information of the profile of the fifth mobile agent 105 (S124). The social management module of the fourth mobile agent 104 opens a socket based on the IP address and the port number present in the profile of the second mobile agent 102 and sends driving information of the fourth mobile agent 104 to the corresponding socket after forming the social with the second mobile agent 102 (S125).

The fifth mobile agent 105 connects to the web server of the second mobile agent 102 by using the web ID of the fifth mobile agent 105 (S126).

The identity check module of the second mobile agent 102 checks the web ID of the fifth mobile agent 105 connecting to the web server of the second mobile agent 102 (S127).

The social management module of the second mobile agent 102 connects to the web ID server of the fifth mobile agent 105 having the web ID of the fifth mobile agent 105 as a domain (S128) and fetches the profile of the fifth mobile agent 105 (S129).

When it is determined that the web server address included in the front-vehicle information stored in the profile fetched from the fifth mobile agent 105 is identical to the web server address of the second mobile agent 102, the social management module of the second mobile agent 102 opens the socket based on the IP address and the port number present in the profile of the fifth mobile agent 105 and sends driving information of the second mobile agent 102 to the corresponding socket after forming the social with the fifth mobile agent 105 (S130).

The identity information management module of the fifth mobile agent 105 updates the driving information of the second mobile agent 102 so as to be incorporated in the front-vehicle information of the profile of the fifth mobile agent 105.

Finally, the second mobile agent 102 updates the web server address of the fourth mobile agent 104 so as to be incorporated in the front-vehicle information of the profile of the second mobile agent 102 (S131).

Figure 11:
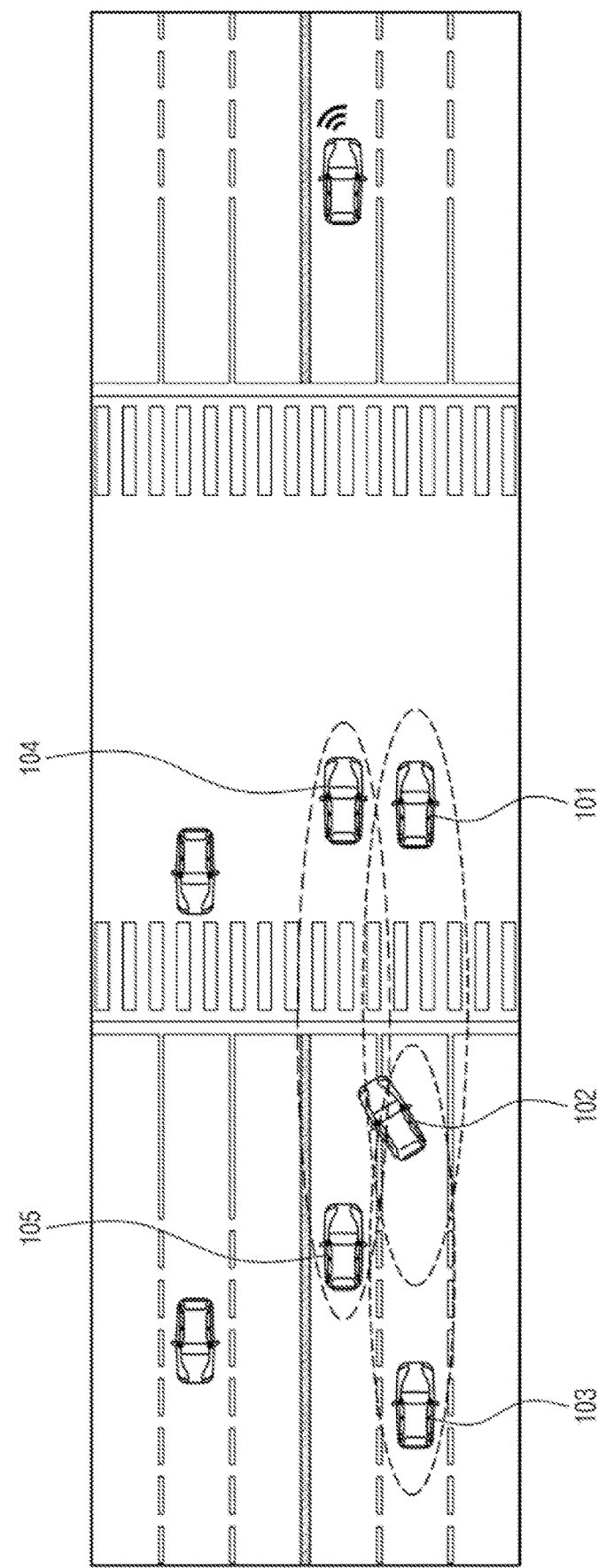
FIG. 11 is a diagram illustrating a situation where a second mobile agent changes lanes and is going to move to the front of a fifth mobile agent.
Figure 12:
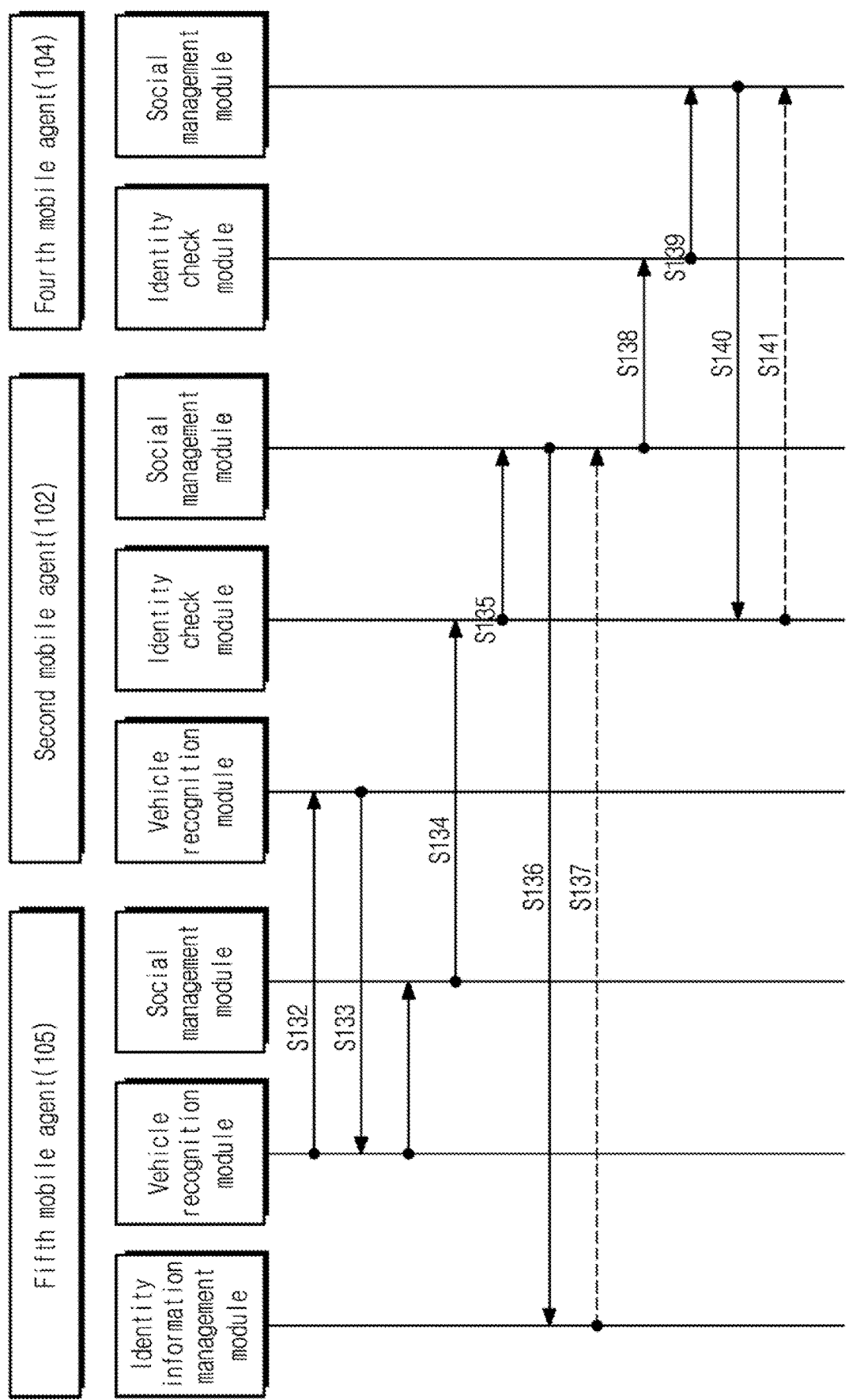
FIG. 12 is a diagram illustrating a process where a social between a fourth mobile agent and a fifth mobile agent is released and a social is formed between a second mobile agent and a fifth mobile agent, in the situation of FIG. 11.

FIG. 11 is a diagram illustrating a situation where the second mobile agent 102 changes lanes and is going to move to the front of the fifth mobile agent 105, and FIG. 12 is a diagram illustrating a process where the social between the fourth mobile agent 104 and the fifth mobile agent 105 is released and the social is formed between the second mobile agent 102 and the fifth mobile agent 105, in the situation of FIG. 11.

Referring to FIGS. 11 and 12, it may be understood that the second mobile agent 102 changes lanes and is going to move to the front of the fifth mobile agent 105 under driving on the changed line.

The social forming and releasing process that is performed when the second mobile agent 102 changes lanes and goes to the front of the fifth mobile agent 105 is as follows.

First, the vehicle recognition module of the fifth mobile agent 105 sends the front-vehicle check signal to the vehicle recognition module of the second mobile agent 102 being a front vehicle (S132).

When the vehicle recognition module of the second mobile agent 102 receiving the front-vehicle check signal sends the answer signal in which the web server address of the second mobile agent 102 is included, the vehicle recognition module of the fifth mobile agent 105 receives the answer signal (S133).

The social management module of the fifth mobile agent 105 connects to the web server of the second mobile agent 102 by using the web ID of the fifth mobile agent 105 (S134).

Operation S132 to operation S134 are identical to operation S101 to operation S103 described above, and thus, additional description will be omitted to avoid redundancy.

The identity check module of the second mobile agent 102 checks the web ID of the fifth mobile agent 105 connecting to the web server of the second mobile agent 102

(S135), connects to the web ID server of the fifth mobile agent 105 having the corresponding web ID as a domain through the social management module (S136), and fetches the profile of the fifth mobile agent 105 (S137). Because the web server address of the fifth mobile agent 105 is present in the profile, the second mobile agent 102 may know the web server address of the fifth mobile agent 105 through the above process.

Also, existing front-vehicle information, in other words, the web server address of the fourth mobile agent 104 is present in the profile of the fifth mobile agent 105. Accordingly, the second mobile agent 102 may know the web server address of the fourth mobile agent 104 through the front-vehicle information of the profile of the fifth mobile agent 105.

The social management module of the second mobile agent 102 connects to the web server of the fourth mobile agent 104 by using the web ID of the second mobile agent 102 (S138).

The fourth mobile agent 104 checks the web ID of the second mobile agent 102 connecting to the web server of the fourth mobile agent 104 through the identity check module (S139), connects to the web ID server of the second mobile agent 102 having the corresponding web ID as a domain through the social management module (S140), and fetches the profile of the second mobile agent 102 (S141). Because the web server address of the second mobile agent 102 is present in the profile, the fourth mobile agent 104 may know the web server address of the second mobile agent 102 through the above process.

The process of forming the social between the second mobile agent 102 and the fourth mobile agent 104 and the process of forming the social between the second mobile agent 102 and the fifth mobile agent 105 are substantially identical to those described with reference to FIGS. 9 and 10, and thus, additional description will be omitted to avoid redundancy.

Below, the process of forming and releasing the social between the mobile agent 100 and the stationary agents 200 will be described.

Figure 13:
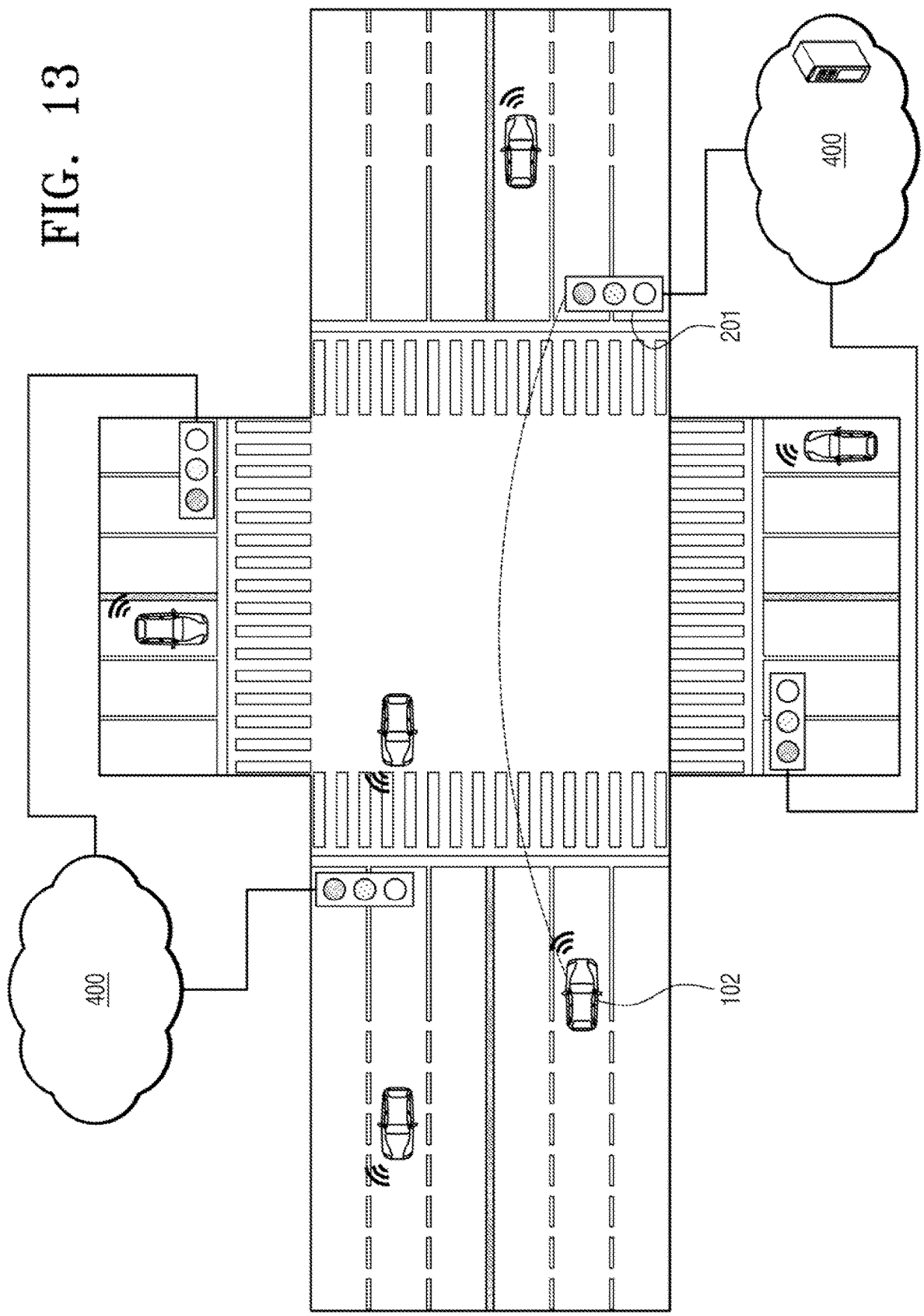
FIG. 13 is a diagram illustrating a situation where a second mobile agent drives toward a vehicle traffic light in front of the second mobile agent.
Figure 14:
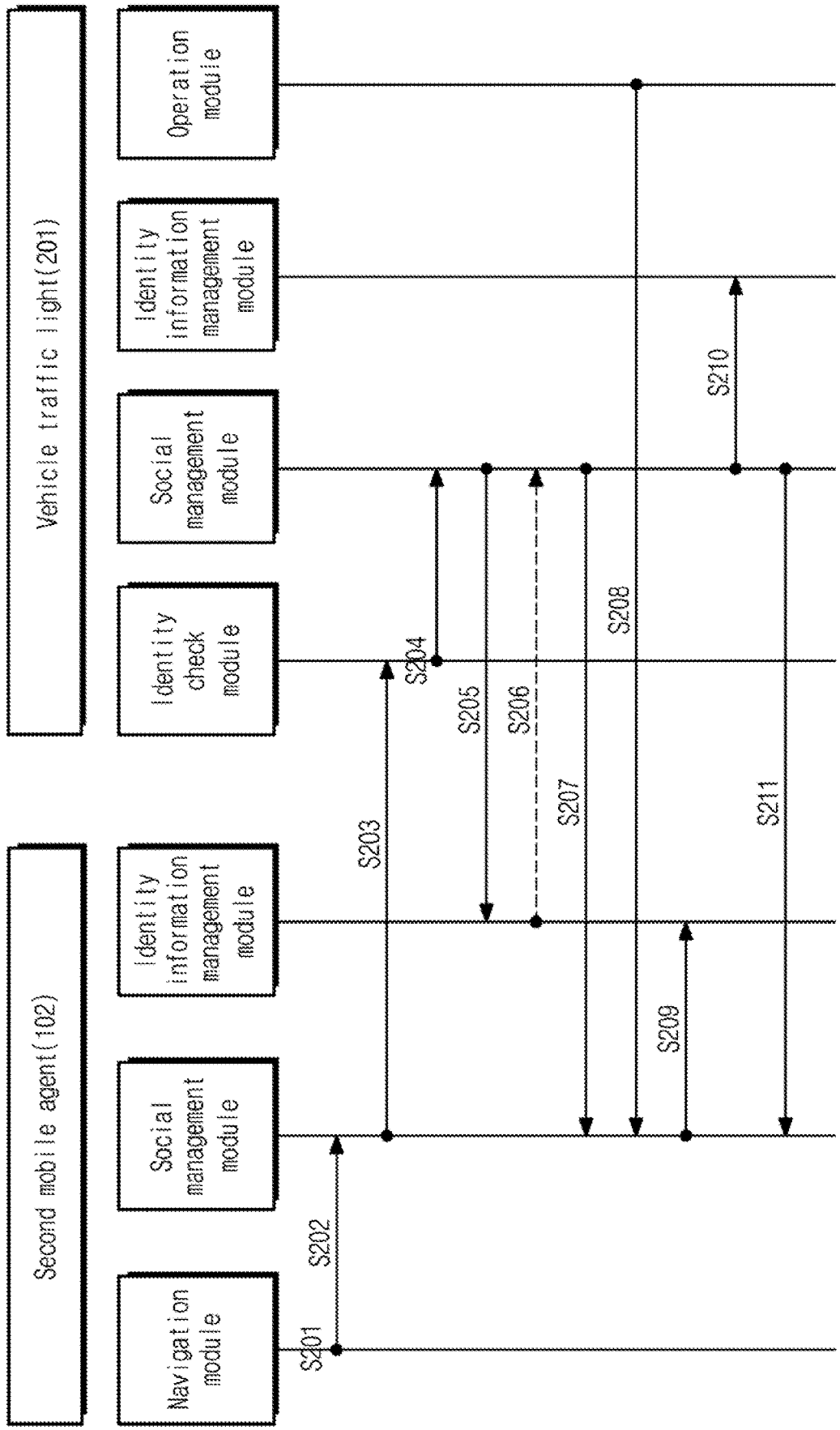
FIG. 14 is a diagram illustrating a process of forming and releasing a social between a second mobile agent and a vehicle traffic light in the situation of FIG. 13.

FIG. 13 is a diagram illustrating a situation where the second mobile agent 102 drives toward a vehicle traffic light 201 in front of the second mobile agent 102, FIG. 14 is a diagram illustrating a process of forming and releasing a social between the second mobile agent 102 and the vehicle traffic light 201 in the situation of FIG. 13.

Referring to FIGS. 13 and 14, the process of forming and releasing the social between the second mobile agent 102 and the vehicle traffic light 201 is as follows.

First, when the navigation module of the second mobile agent 102 searches for the vehicle traffic light 201 on a driving path and determines that the second mobile agent 102 is within a preset distance (e.g., 500 meters) from the found vehicle traffic light 201 (S201), the navigation module transfers the web server address of the vehicle traffic light 201 to the social management module (S202). In this case, the navigation module may provide the location of the vehicle traffic light 201 and map information including the web server address of the vehicle traffic light 201, and the social management module may obtain the web server address of the vehicle traffic light 201 from the information thus provided.

The social management module of the second mobile agent 102 connects to the web server of the vehicle traffic light 201 by using the web ID of the second mobile agent 102 (S203).

The identity check module of the vehicle traffic light 201 checks the web ID of the second mobile agent 102 connecting to the web server of the vehicle traffic light 201 (S204), connects to the web ID server of the second mobile agent 102 having the corresponding web ID as a domain through the social management module (S205), and fetches the profile of the second mobile agent 102 (S206).

After checking the IP address and the port number present in the profile of the second mobile agent 102, opening a socket, and forming the social with the second mobile agent 102, the social management module of the vehicle traffic light 201 provides the social management module of the second mobile agent 102 with information, which is associated with a mobile agent whose driving lane coincides with the driving lane of the second mobile agent 102, from among information about a mobile agent forming the most recent social (i.e., the web server address and the driving information of a mobile agent forming the most recent social) with regard to each driving lane present in the profile of the vehicle traffic light 201 (S207). In this case, the information about the mobile agent forming the most recent social, which is present in the profile of the vehicle traffic light 201, refers to information about any other mobile agent forming the social before the vehicle traffic light 201 forms the social with the second mobile agent 102, with regard to each lane on the road.

The social management module of the vehicle traffic light 201 sends, to the second mobile agent 102, operation information of the vehicle traffic light 201 (i.e., real-time operation information of the vehicle traffic light 201) provided from the operation module (S208).

The second mobile agent 102 that receives the information about the mobile agent forming the most recent social and having the same driving lane as the second mobile agent 102 from the vehicle traffic light 201 may update the corresponding information so as to be incorporated in the profile of the second mobile agent 102 as front vehicle information (S209). The second mobile agent 102 may form the social with a mobile agent, which passes the vehicle traffic light 201 in advance of the second mobile agent 102, by using the information thus updated. This will be described in detail with reference to FIGS. 15 and 16.

The social management module of the vehicle traffic light 201 updates the web server address and the driving information of the second mobile agent 102 present in the profile fetched from the second mobile agent 102, so as to be incorporated in the profile of the second mobile agent 102 as the information about the mobile agent forming the most recent social with regard to the corresponding lane on the road (S210).

Finally, when the distance from the second mobile agent 102 is within a preset distance (e.g., 0.5 meters), the social management module of the vehicle traffic light 201 releases the social formation with the second mobile agent 102 (S211).

Figure 15:
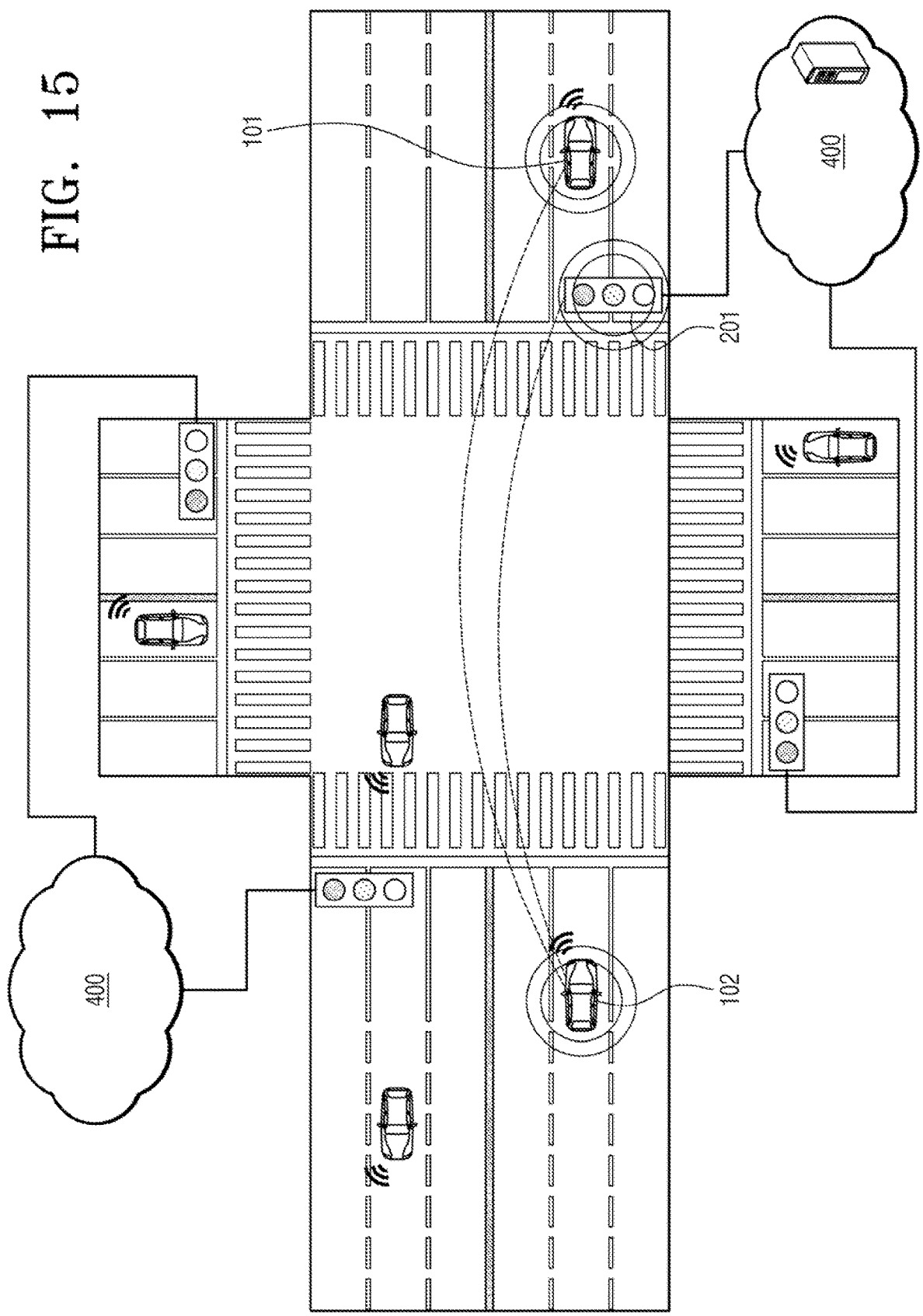
FIG. 15 is a diagram illustrating a situation where a first mobile agent passes a vehicle traffic light and then a second mobile agent approaches the same vehicle traffic light.
Figure 16:
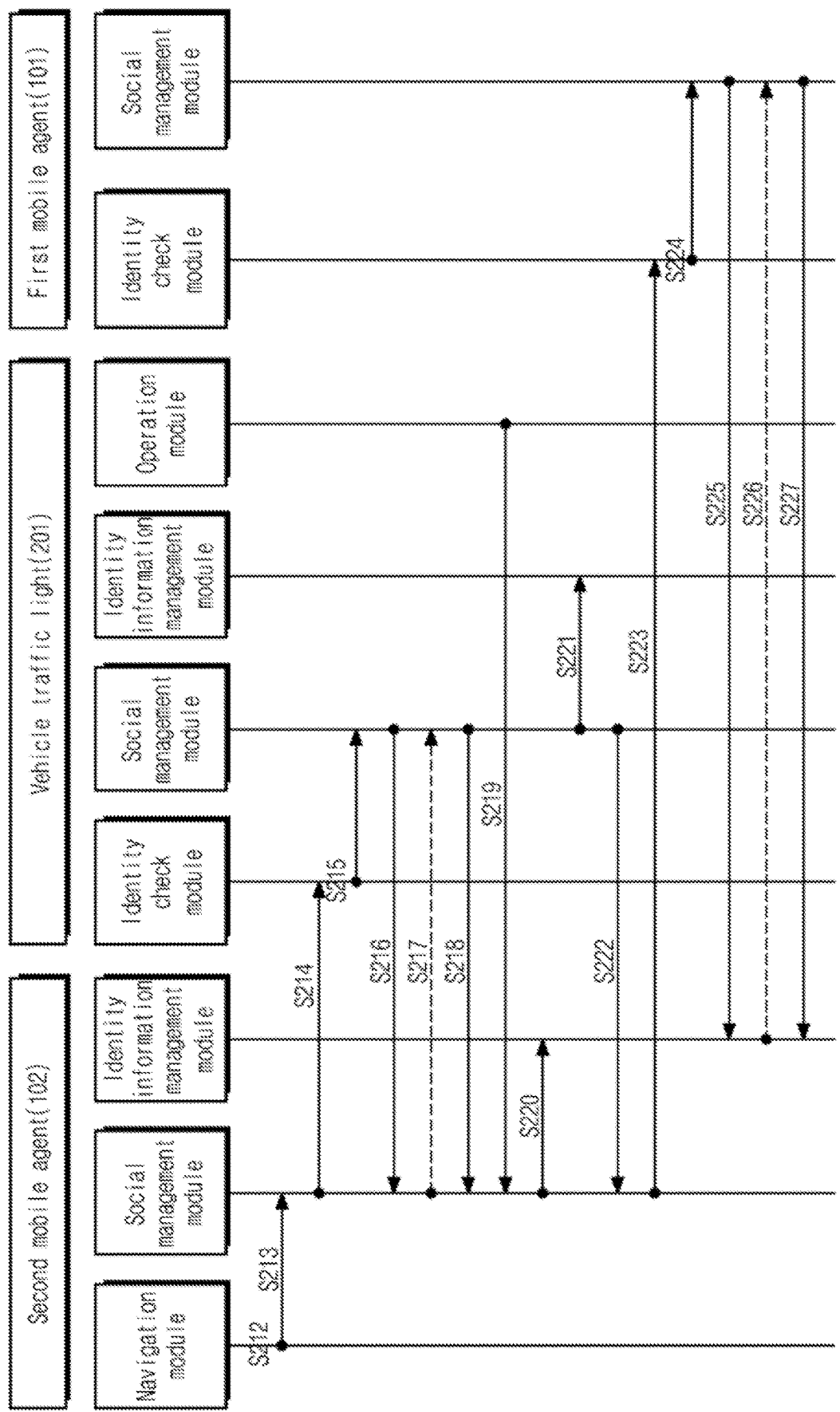
FIG. 16 is a diagram illustrating a process where a second mobile agent forms a social with a first mobile agent by using information about a mobile agent forming the most recent social, which is present in the profile of a vehicle traffic light.

FIG. 15 is a diagram illustrating a situation where the first mobile agent 101 passes the vehicle traffic light 201 and then the second mobile agent 102 approaches the same vehicle traffic light 201, and FIG. 16 is a diagram illustrating a process where the second mobile agent 102 forms a social with the first mobile agent 101 by using information about a mobile agent forming the most recent social, which is present in the profile of the vehicle traffic light 201.

Referring to FIGS. 15 and 16, the second mobile agent 102 may form the social with the first mobile agent 101 by using the profile of the vehicle traffic light 201.

First, when the vehicle traffic light 201 is found within a preset distance (e.g., 500 meters) in front of the second mobile agent 102 (S212), the navigation module of the second mobile agent 102 transfers the web server address of the vehicle traffic light 201 to the social management module (S213). In this case, the web server address of the vehicle traffic light 201 may be stored in the navigation module together with the location information of the vehicle traffic light 201.

The social management module of the second mobile agent 102 connects to the web server of the vehicle traffic light 201 by using the web ID of the second mobile agent 102 (S214).

The identity check module of the vehicle traffic light 201 checks the web ID of the second mobile agent 102 connecting to the web server of the vehicle traffic light 201 (S215), connects to the web ID server of the second mobile agent 102 having the corresponding web ID as a domain through the social management module (S216), and fetches the profile of the second mobile agent 102 (S217).

After checking the IP address and the port number present in the profile of the second mobile agent 102, opening a socket, and forming the social with the second mobile agent 102, the social management module of the vehicle traffic light 201 provides the social management module of the second mobile agent 102 with information of the first mobile agent 101, whose driving lane coincides with the driving lane of the second mobile agent 102, from among mobile agents forming the most recent social (i.e., the web server address and the driving information of a first mobile agent) with regard to each driving lane present in the profile of the vehicle traffic light 201 (S218).

The social management module of the vehicle traffic light 201 sends, to the second mobile agent 102, operation information of the vehicle traffic light 201 (i.e., real-time operation information of the vehicle traffic light 201) provided from the operation module (S219).

The second mobile agent 102 that receives information about the first mobile agent 101 (i.e., the web server address and the driving information of the first mobile agent 101) from the vehicle traffic light 201 updates the corresponding information so as to be incorporated in the front-vehicle information of the profile of the second mobile agent 102 (S220).

The social management module of the vehicle traffic light 201 updates the web server address and the driving information of the second mobile agent 102 present in the profile fetched from the second mobile agent 102, so as to be incorporated in the profile of the second mobile agent 102 as the information about the mobile agent forming the most recent social (S221).

When the distance from the second mobile agent 102 is within a preset distance (e.g., 0.5 meters), the social management module of the vehicle traffic light 201 releases the social formation with the second mobile agent 102 (S222).

The second mobile agent 102 connects to the web server of the first mobile agent 101 by using the web ID of the second mobile agent 102 (S223).

The first mobile agent 101 checks the web ID of the second mobile agent 102 connecting to the web server of the first mobile agent 101 through the identity check module (S224), connects to the web ID server of the second mobile agent 102 having the corresponding web ID as a domain through the social management module (S225), and fetches the profile of the second mobile agent 102 (S226).

Finally, the social management module of the first mobile agent 101 opens a socket based on the IP address and the port number present in the profile fetched from the second mobile agent 102 and sends driving information of the first mobile agent 101 to the corresponding socket after forming the social with the second mobile agent 102 (S227).

Figure 17:
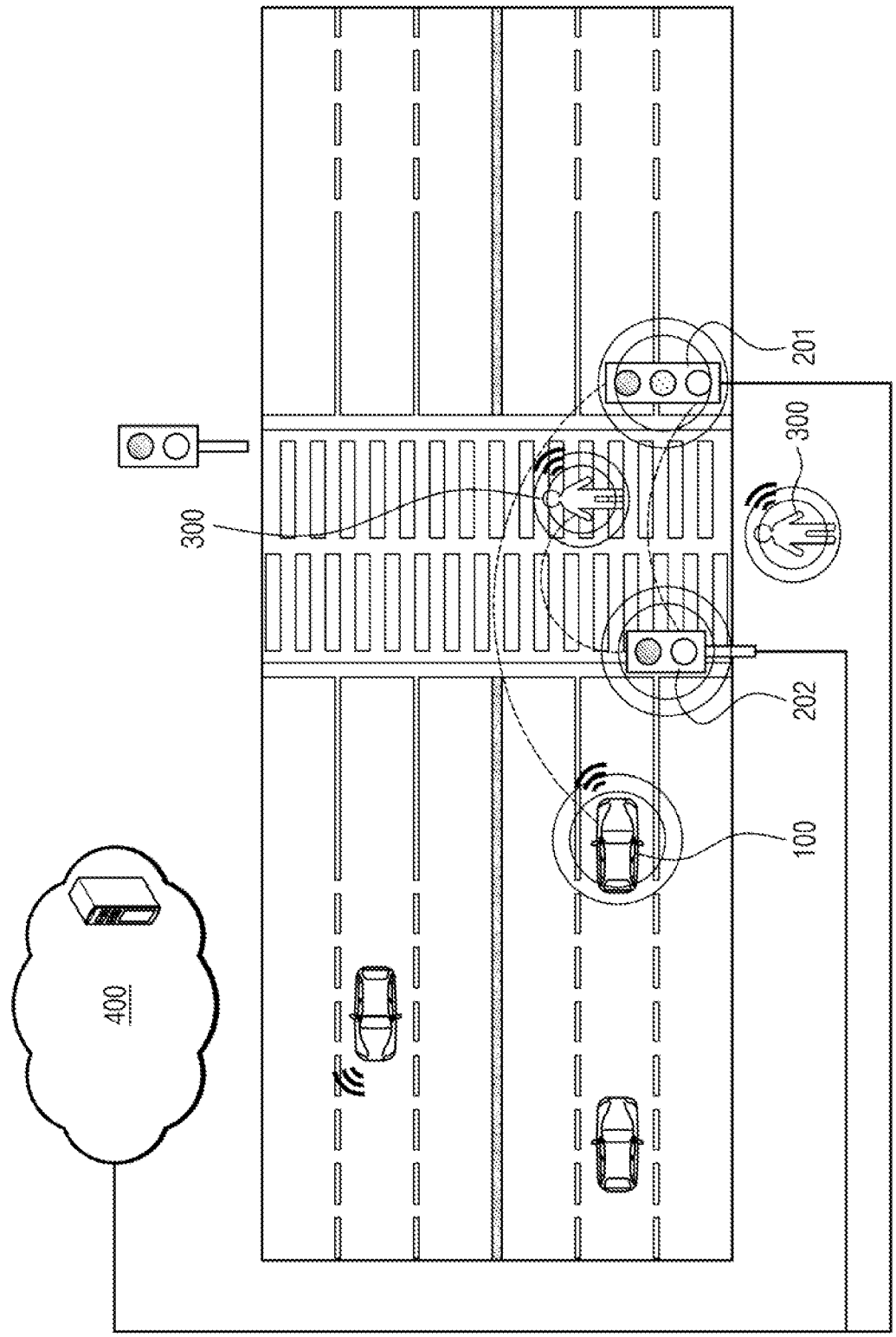
FIG. 17 is a diagram illustrating a situation where a pedestrian crosses a crosswalk on a straight driving path of a mobile agent.
Figure 18:
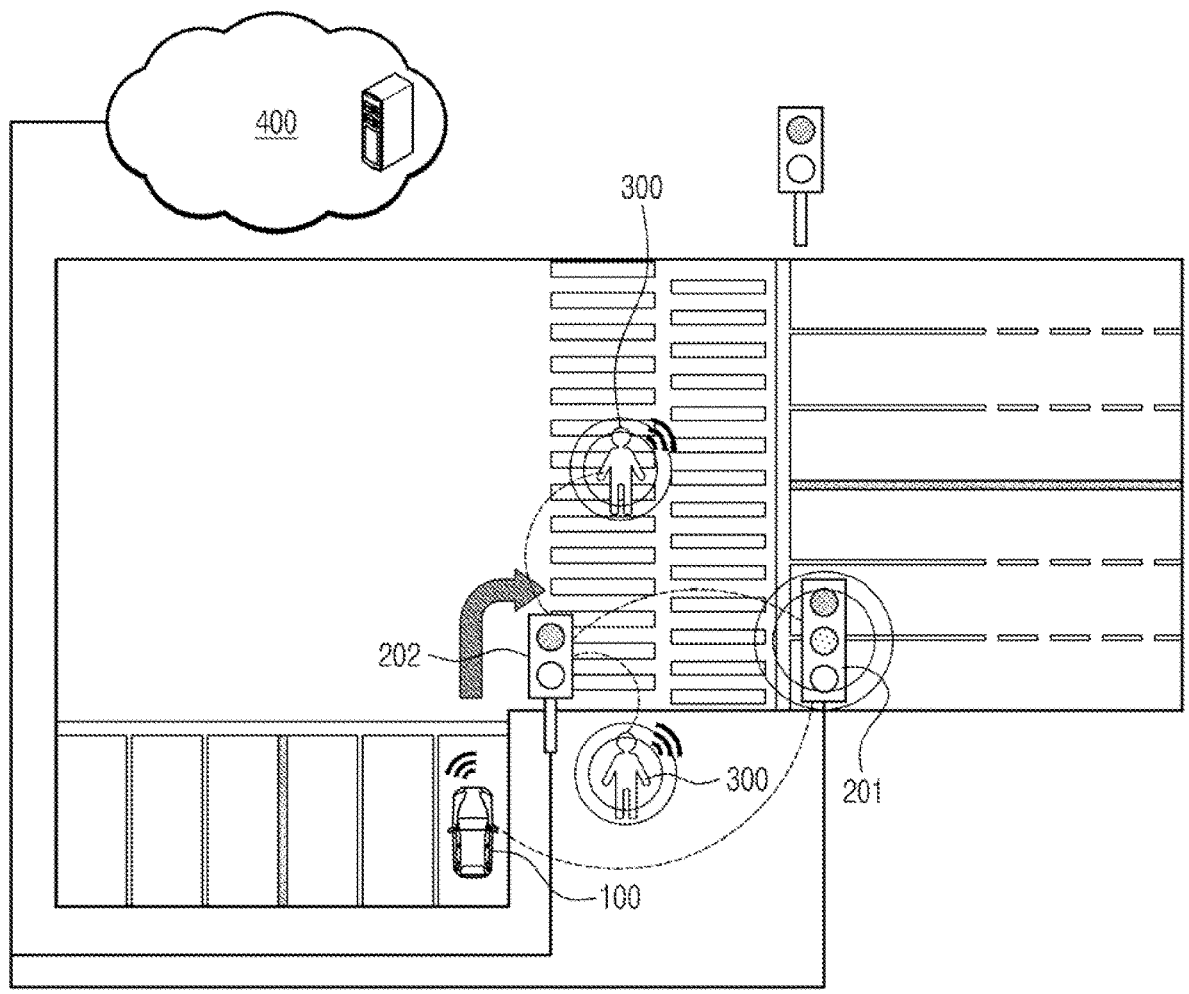
FIG. 18 is a diagram illustrating a situation where a pedestrian crosses a crosswalk on a right turn path of a mobile agent.
Figure 19:
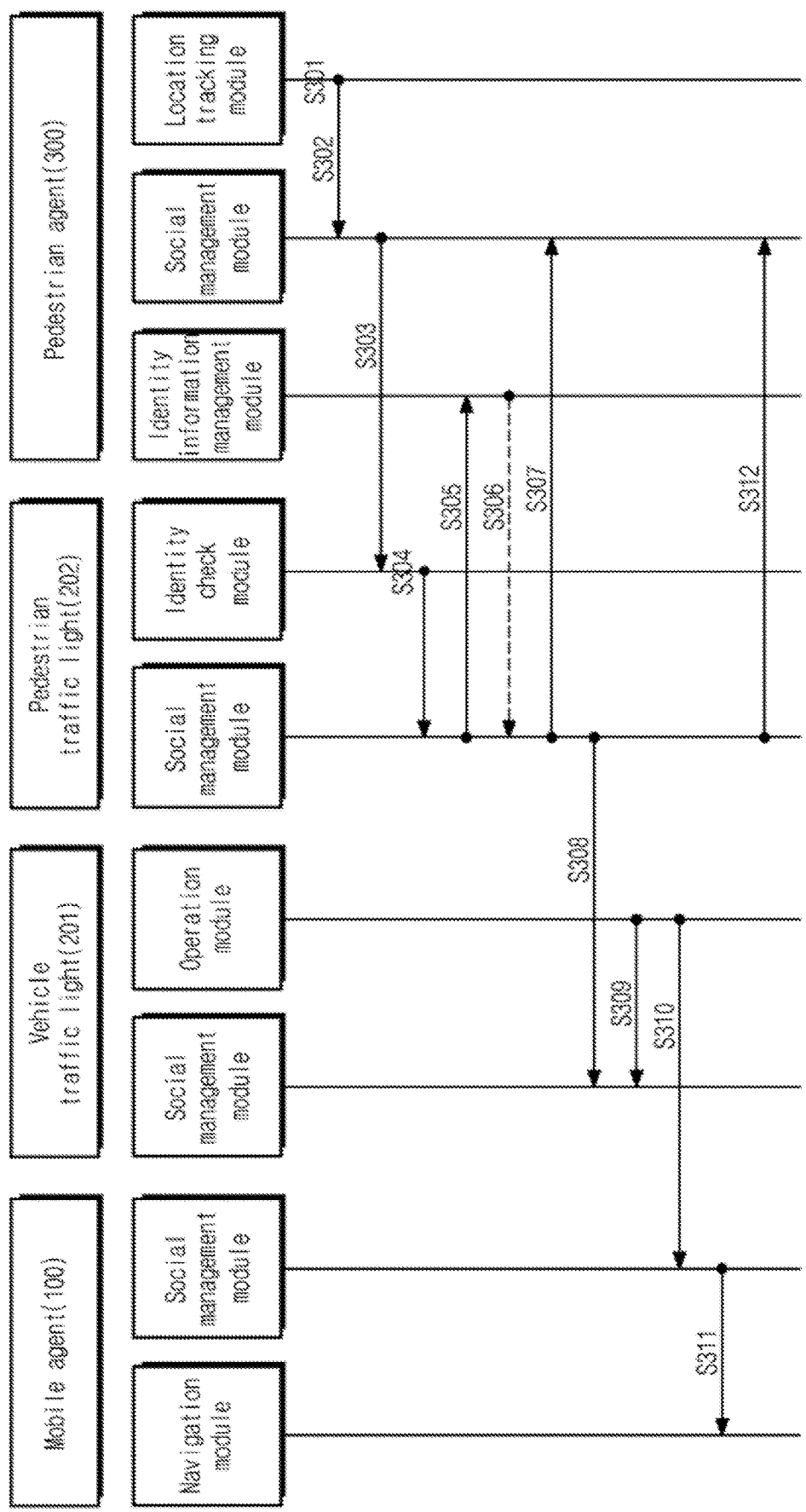
FIG. 19 is a diagram illustrating a process of forming and releasing a social between a mobile agent, a vehicle traffic light, a pedestrian traffic light, and a pedestrian agent.

FIG. 17 is a diagram illustrating a situation where a pedestrian crosses a crosswalk on a straight driving path of the mobile agent 100, FIG. 18 is a diagram illustrating a situation where a pedestrian crosses a crosswalk on a right turn path of the mobile agent 100, and FIG. 19 is a diagram illustrating a process of forming and releasing a social between the mobile agent 100, the vehicle traffic light 201, the pedestrian traffic light 202, and the pedestrian agent 300.

Referring to FIGS. 17 to 19, the process of forming and releasing the social between the mobile agent 100, the vehicle traffic light 201, the pedestrian traffic light 202, and the pedestrian agent 300 is as follows.

It is assumed that the social is formed between the mobile agent 100 and the vehicle traffic light 201 through operation S201 to operation S207 described with reference to FIG. 15 and a wired/wireless communication network is established between the vehicle traffic light 201 and the pedestrian traffic light as illustrated in FIG. 1.

First, when the location tracking module of the pedestrian agent 300 (e.g., a smartphone) possessed by a pedestrian determines that the pedestrian approaches the pedestrian traffic light 202 within a preset interval (e.g., 5 meters) (S301), the location tracking module transfers the web server address of the pedestrian traffic light 202 to the social management module (S302). In this case, the location of the pedestrian traffic light 202 and the web server address of the pedestrian traffic light 202 may be present in the location tracking module of the pedestrian agent 300, and the distance between the pedestrian and the pedestrian traffic light 202 may be determined to identify the location of the pedestrian in real time through the GPS.

The social management module of the pedestrian agent 300 connects to the web server of the pedestrian traffic light 202 by using the web ID of the pedestrian agent 300 (S303).

The identity check module of the pedestrian traffic light 202 checks the web ID of the pedestrian agent 300 connecting to the web server of the pedestrian traffic light 202 (S304), connects to the web ID server of the pedestrian agent 300 having the corresponding web ID as a domain through the social management module (S305), and fetches the profile of the pedestrian agent 300 (S306). In this case, the profile of the pedestrian agent 300 may include the web server address, the web ID, the IP address, and the port number of the pedestrian agent 300 and the location information of the pedestrian agent 300.

The social management module of the pedestrian traffic light 202 opens a socket by using the IP address and the port number included in the profile fetched from the pedestrian agent 300 and forms the social with the pedestrian agent 300 (S307).

Afterwards, the social management module of the pedestrian traffic light 202 may track the location of the pedestrian agent 300 by continuously fetching the profile of the pedestrian agent 300.

The social management module of the pedestrian traffic light 202 sends information about the location of the pedestrian agent 300 to the social management module of the vehicle traffic light 201 (S308).

The social management module of the vehicle traffic light 201 receives the operation information of the vehicle traffic light 201 from the operation module 240 (S309) and sends the operation information of the vehicle traffic light 201 and the location information of the pedestrian agent 300 to the social management module of the mobile agent 100 (S310).

The navigation module of the mobile agent 100 may display the location of the pedestrian provided from the vehicle traffic light 201 on a navigation map (S311) such that the driver checks locations of pedestrians while driving through the navigation map. Accordingly, it may be possible to reduce the risk of accidents with the pedestrians.

Finally, when the location of the pedestrian identified through the location tracking module faces away from the pedestrian traffic light 202 as much as a preset distance or more (e.g., 30 meters or more), the social management module of the pedestrian agent 300 releases the social formation with the pedestrian traffic light 202 (S312).

Figure 20:
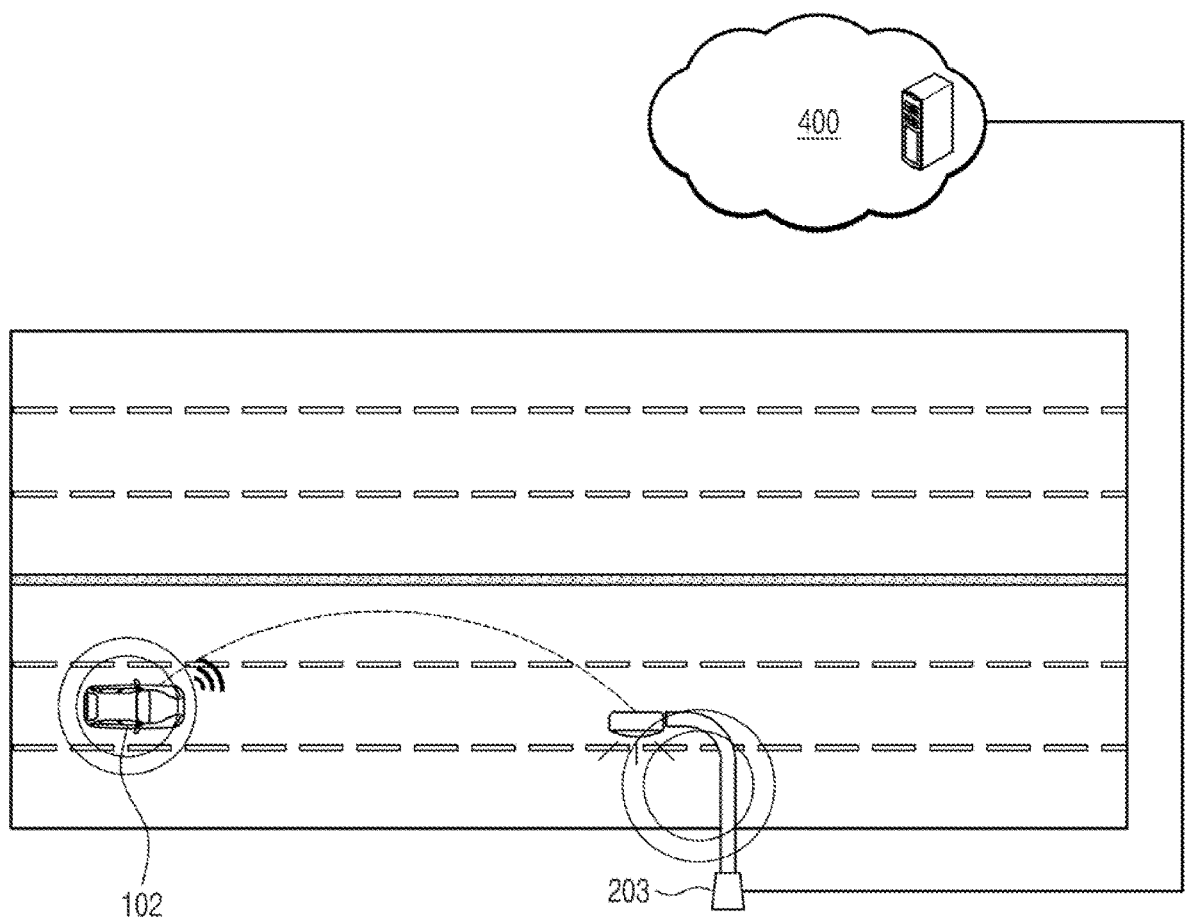
FIG. 20 is a diagram illustrating a situation where a second mobile agent drives toward a street light.
Figure 21:
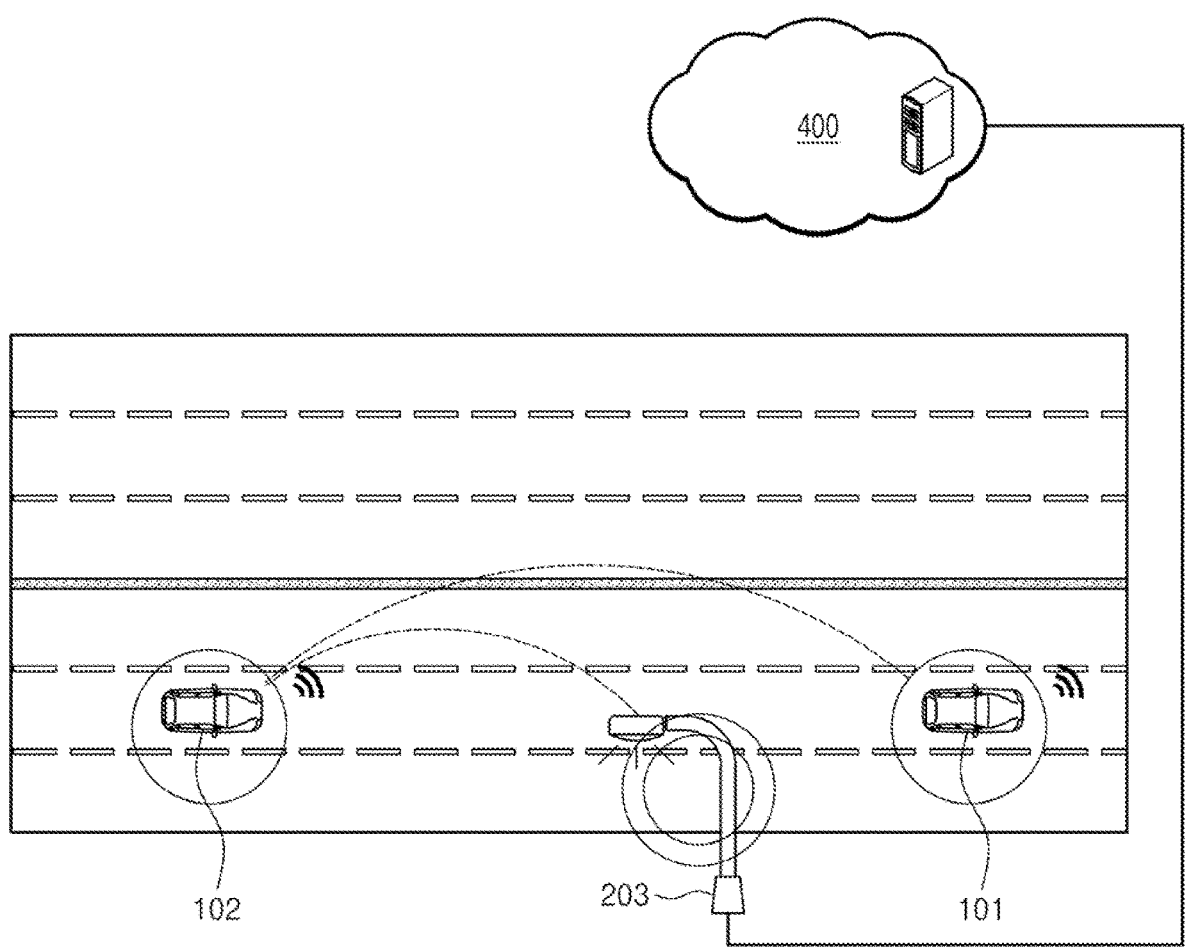
FIG. 21 is a diagram illustrating a situation where a first mobile agent passes a street light and then a second mobile agent approaches the same street light.
Figure 22:
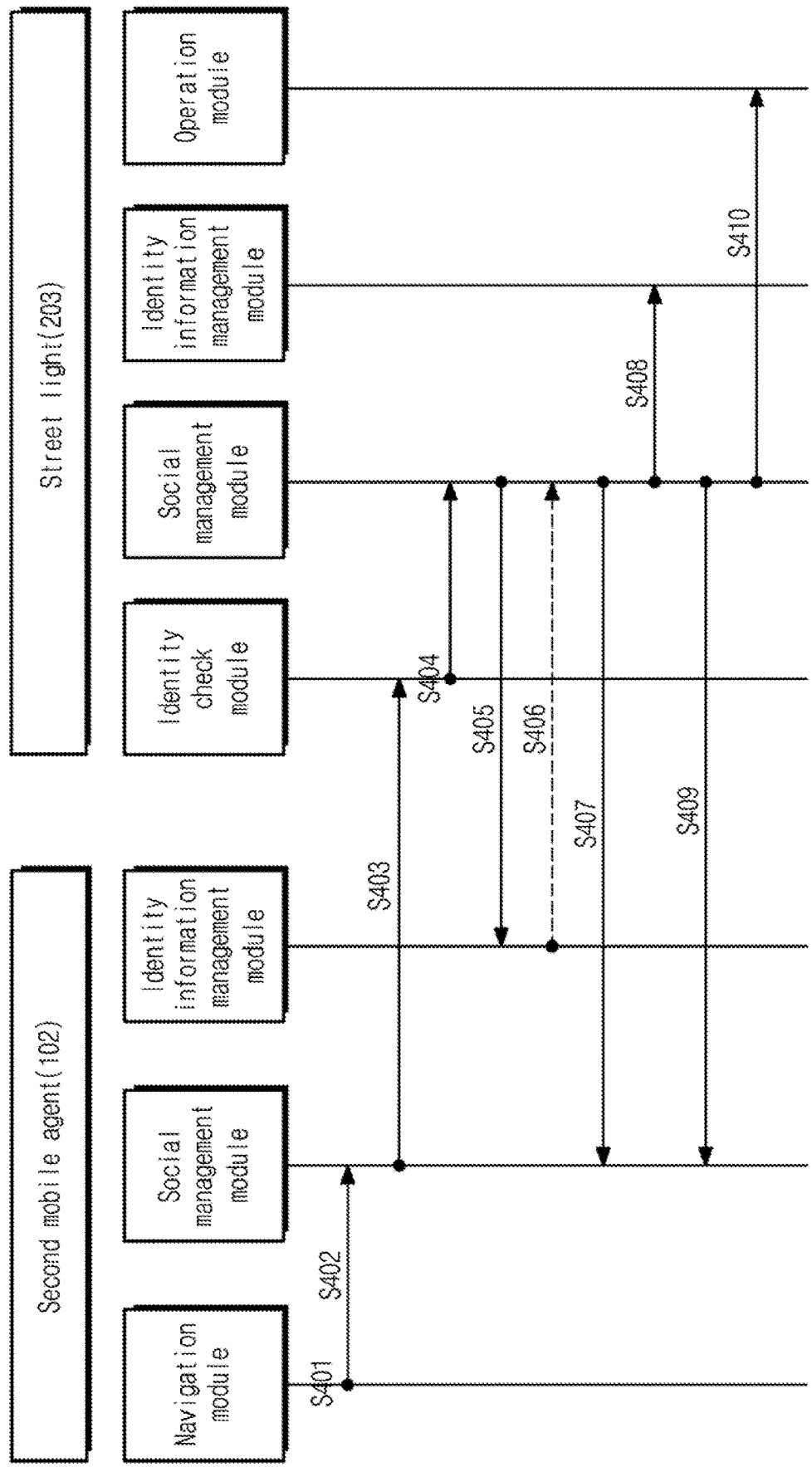
FIG. 22 is a diagram illustrating a process of forming and releasing a social between a first mobile agent, a street light, and a second mobile agent.

FIG. 20 is a diagram illustrating a situation where the second mobile agent 102 drives toward the street light 203, FIG. 21 is a diagram illustrating a situation where the first mobile agent 101 passes the street light 203 and then the second mobile agent 102 approaches the same street light 203, and FIG. 22 is a diagram illustrating a process of forming and releasing a social between the first mobile agent 101, the street light 203, and the second mobile agent 102.

Referring to FIGS. 20 to 22, the first mobile agent 101 that approaches the street light 203 may form the social with the street light 203; afterwards, the second mobile agent 102 that approaches the same street light 203 may obtain information about the first mobile agent 101 from the street light 203 and may form the social with the first mobile agent 101.

First, when the street light 203 is found within a preset distance (e.g., 300 meters) in front of the second mobile agent 102 (S401), the navigation module of the second mobile agent 102 transfers the web server address of the street light 203 to the social management module (S402). In this case, the location of the street light 203 and the web server address of the street light 203 may be present in the navigation module.

The social management module of the second mobile agent 102 connects to the web server of the street light 203 by using the web ID of the second mobile agent 102 (S403).

The identity check module of the street light 203 checks the web ID of the second mobile agent 102 connecting to the web server of the street light 203 (S404), connects to the web ID server of the second mobile agent 102 having the corresponding web ID as a domain through the social management module (S405), and fetches the profile of the second mobile agent 102 (S406).

After checking the IP address and the port number present in the profile of the second mobile agent 102, opening a socket, and forming the social with the second mobile agent 102, the social management module of the street light 203 provides the social management module of the second mobile agent 102 with information about a mobile agent forming the most recent social, included in the profile of the street light 203 (i.e., the web server address and the driving information of a mobile agent) (S407).

The social management module of the street light 203 updates the web server address and the driving information of the second mobile agent 102 present in the profile fetched from the second mobile agent 102, so as to be incorporated in the profile of the street light 203 as the information about the mobile agent forming the most recent social (S408).

Afterwards, when the distance from the second mobile agent 102 is within a preset distance (e.g., 0.5 meters), the social management module of the street light 203 releases the social formation with the second mobile agent 102 (S409).

Finally, when the current time is the time after sunset, the operation module of the street light 203 turns on the street light 203 for a preset time (e.g., 15 seconds) and then turns off the street light 203 (S410).

As described above, once the street light 203 forms the social with the mobile agent 100, the street light 203 stores information about the mobile agent 100 as information about a mobile agent forming the most recent social, included in the profile of the street light 203. Accordingly, mobile agents passing by the same street light may form the social by using the corresponding information.

For example, as illustrated in FIG. 21, when the first mobile agent 101 and the second mobile agent 102 sequentially pass by the same street light 203, the second mobile agent 102 may obtain information about the first mobile agent 101 (i.e., a web server address and driving information of an first mobile agent) from the street light 203, and the second mobile agent 102 may form the social with the first mobile agent 101 by using the information thus obtained. The above process is substantially identical to the process composed of operation S223 to operation S227 illustrated in FIG. 16, and thus, additional description will be omitted to avoid redundancy.

Through the above embodiments, the autonomous driving-related data transmitting and receiving system 10 may perform the process of forming and releasing the social between the mobile agent 100, the stationary agent 200, and the pedestrian agent 300, and may help the autonomous driving of the mobile agent 100 by using pieces of data exchanged in the above process.

According to an embodiment of the present disclosure, a system and a method for transmitting and receiving autonomous driving-related data may enable safer autonomous driving by forming the social between a mobile agent, a stationary agent, and pedestrian agents and transmitting and receiving the autonomous driving-related data between agents forming the social.

While the present disclosure has been described with reference to exemplary embodiments, it will be apparent to those skilled in the art that various changes and modifications may be made without departing from the spirit and scope of the present disclosure. Therefore, it should be understood that the above embodiments are not limiting, but illustrative.

What is claimed is:

1. A method for transmitting and receiving autonomous driving-related data, the method comprising:
obtaining, by a second mobile agent driving in a first lane, a web server address of a first mobile agent driving in front of the second mobile agent in the first lane;
performing a first identity check procedure between the second mobile agent and the first mobile agent;
forming a first connection between the second mobile agent and the first mobile agent;
releasing, by the second mobile agent, the first connection when the second mobile agent makes a lane change to a second lane;
performing a second identity check procedure between the first mobile agent and a third mobile agent driving behind the first mobile agent in the first lane after the second mobile agent makes the lane change; and
forming a second connection between the first and third mobile agents after the second mobile agent makes the lane change,
wherein the obtaining of the web server address of the first mobile agent includes:

sending, by the second mobile agent, a front-vehicle check signal to the first mobile agent, the front-vehicle check signal including GPS location information, driving direction information, and driving lane information of the second mobile agent; and receiving, by the second mobile agent, an answer signal from the first mobile agent, the answer signal including the web server address of the first mobile agent and distance information indicating a distance between the first and second mobile agents, wherein the releasing of the first connection includes:
sending, by the second mobile agent, the web server address of the first mobile agent to the third mobile agent when the second mobile agent makes the lane change;

deleting, by the second mobile agent, front-vehicle information included in a profile of the second mobile agent; and releasing, by the second mobile agent, the first connection.

2. The method of claim 1, wherein the performing of the first identity check procedure between the second mobile agent and the first mobile agent includes:
connecting, by the second mobile agent, to a web server of the first mobile agent by using a web ID of the second mobile agent;

checking, by the first mobile agent, the web ID of the second mobile agent; and fetching, by the first mobile agent, the profile of the second mobile agent by connecting to a web ID server of the second mobile agent having the web ID of the second mobile agent as a domain.

3. The method of claim 1, wherein the forming of the first connection includes:
opening, by the first mobile agent, a socket based on an IP address and a port number included in the profile of the second mobile agent and forming the first connection;

sending, by the first mobile agent, driving information of the first mobile agent to the second mobile agent; and updating, by the second mobile agent, the web server address and the driving information of the first mobile agent so as to be incorporated in the profile of the second mobile agent as the front-vehicle information of the second mobile agent.

4. The method of claim 1, wherein the performing of the second identity check procedure includes:
updating, by the third mobile agent, the web server address of the first mobile agent being the web server address received from the second mobile agent, so as to be incorporated in a profile of the third mobile agent as front-vehicle information of the third mobile agent;

connecting, by the third mobile agent, to the web server of the first mobile agent by using a web ID of the third mobile agent;

checking, by the first mobile agent, the web ID of the third mobile agent; and fetching, by the first mobile agent, the profile of the third mobile agent by connecting to a web ID server of the third mobile agent having the web ID of the third mobile agent as a domain.

5. The method of claim 1, wherein the forming of the second connection includes:
opening, by the first mobile agent, a socket based on an IP address and a port number included in a profile of the third mobile agent fetched in the second identity check procedure and forming the second connection;

sending, by the first mobile agent, driving information of the first mobile agent to the third mobile agent; and updating, by the third mobile agent, the web server address and the driving information of the first mobile agent so as to be incorporated in the profile of the third mobile agent as front-vehicle information of the third mobile agent.

6. The method of claim 1, further comprising:
forming, by the second mobile agent, a third connection with a fourth mobile agent driving in front of the second mobile agent in the second lane after the second mobile agent makes the lane change, and wherein the forming of the third connection with the fourth mobile agent includes:
obtaining, by the second mobile agent, a web server address of the fourth mobile agent;

performing a third identity check procedure between the second mobile agent and the fourth mobile agent;

releasing, by the fourth mobile agent, a fourth connection previously formed between the fourth mobile agent and a fifth mobile agent driving behind the second mobile agent in the second lane after then second mobile agent makes the lane change; and forming, by the second mobile agent, the third connection with the fourth mobile agent and a fifth connection with the fifth mobile agent.

7. The method of claim 6, wherein the obtaining of the web server address of the fourth mobile agent includes:
sending, by the second mobile agent, a front-vehicle check signal to the fourth mobile agent; and receiving, by the second mobile agent, an answer signal from the fourth mobile agent.

8. The method of claim 6, wherein the performing of the third identity check procedure between the second mobile agent and the fourth mobile agent includes:
connecting, by the second mobile agent, to a web server of the fourth mobile agent by using a web ID of the second mobile agent;

checking, by the fourth mobile agent, the web ID of the second mobile agent; and fetching, by the fourth mobile agent, the profile of the second mobile agent by connecting to a web ID server of the second mobile agent having the web ID of the second mobile agent as a domain.

9. The method of claim 6, wherein the releasing of the fourth connection includes:
sending, by the fourth mobile agent, a web server address of the second mobile agent to the fifth mobile agent and releasing the fourth connection.

10. The method of claim 6, wherein the forming of the third connection with the fourth mobile agent and the fifth connection with the fifth mobile agent includes:
updating a web server address of the second mobile agent being the web server address received from the fourth mobile agent so as to be incorporated in a profile of the fifth mobile agent as front-vehicle information of the fifth mobile agent;

forming, by the fourth mobile agent, the third connection with the second mobile agent and sending driving information of the fourth mobile agent;

connecting, by the fifth mobile agent, to a web server of the second mobile agent by using a web ID of the fifth mobile agent;

checking, by the second mobile agent, the web ID of the fifth mobile agent;

fetching, by the second mobile agent, the profile of the fifth mobile agent by connecting to a web ID server of the fifth mobile agent having a web ID connecting to the web server of the second mobile agent as a domain;

forming, by the second mobile agent, the fifth connection with the fifth mobile agent and sending the driving information of the second mobile agent; and updating, by the fifth mobile agent, the driving information of the second mobile agent so as to be incorporated in the profile of the fifth mobile agent as front-vehicle information of the fifth mobile agent.

11. The method of claim 1, further comprising:

forming, by the second mobile agent, a third connection with a fifth mobile agent driving behind the second mobile agent in the second lane after the second mobile agent makes the lane change, and wherein the forming of the third connection with the fifth mobile agent includes:

obtaining, by the fifth mobile agent, a web server address of the second mobile agent;

performing a third identity check procedure between the fifth mobile agent and the second mobile agent;

releasing, by a fourth mobile agent driving in front of the second mobile agent in the second lane after the second mobile agent makes the lane change, a fourth connection previously formed between the fourth mobile agent and the fifth mobile agent; and forming, by the second mobile agent, the third connection with the fifth mobile agent and a fifth connection with the fourth mobile agent.

12. The method of claim 11, wherein the forming of the third connection with the fifth mobile agent and the fifth connection with the fourth mobile agent includes:

fetching a profile of the fifth mobile agent from the fifth mobile agent through a social management module of the second mobile agent;

checking a web server address of the fourth mobile agent included in the profile of the fifth mobile agent through the social management module of the second mobile agent; and connecting to a web server of the fourth mobile agent through the social management module of the second mobile agent by using a web ID of the second mobile agent.

13. A non-transitory computer-readable recording medium storing a program which, when executed, causes the computer to perform the autonomous driving data-related method according to claim 1.

* * * * *